United States Patent [19]
Jasper et al.

[11] Patent Number: 5,381,449
[45] Date of Patent: Jan. 10, 1995

[54] PEAK TO AVERAGE POWER RATIO REDUCTION METHODOLOGY FOR QAM COMMUNICATIONS SYSTEMS

[75] Inventors: Steven C. Jasper, Hoffman Estates; Mark A. Birchler, Roselle, both of Ill.

[73] Assignee: Motorola, Inc., Schaumburg, Ill.

[21] Appl. No.: 786,681

[22] Filed: Nov. 1, 1991

Related U.S. Application Data

[63] Continuation-in-part of Ser. No. 536,825, Jun. 12, 1990.

[51] Int. Cl.$^6$ .............................................. H04L 27/04
[52] U.S. Cl. ........................................ 375/59; 332/103
[58] Field of Search ..................... 375/38, 39, 42, 59, 375/60; 370/9, 10, 12, 18, 19, 20; 332/103, 144

[56] References Cited

U.S. PATENT DOCUMENTS

| | | | |
|---|---|---|---|
| 3,955,141 | 5/1976 | Lyon et al. | 375/8 |
| 4,464,767 | 8/1984 | Bremer | 375/67 |
| 4,646,305 | 2/1987 | Tretter et al. | 375/39 |
| 4,680,775 | 7/1987 | Exarque et al. | 375/39 |

Primary Examiner—Stephen Chin
Attorney, Agent, or Firm—Joseph P. Krause

[57] ABSTRACT

The ratio of peak power level to average power level in a power amplifier used in a QAM communication system transmitter can be reduced by preselecting magnitudes and phase angles of complex-valued pilot symbols used in multi-channel, N-level QAM.

20 Claims, 3 Drawing Sheets

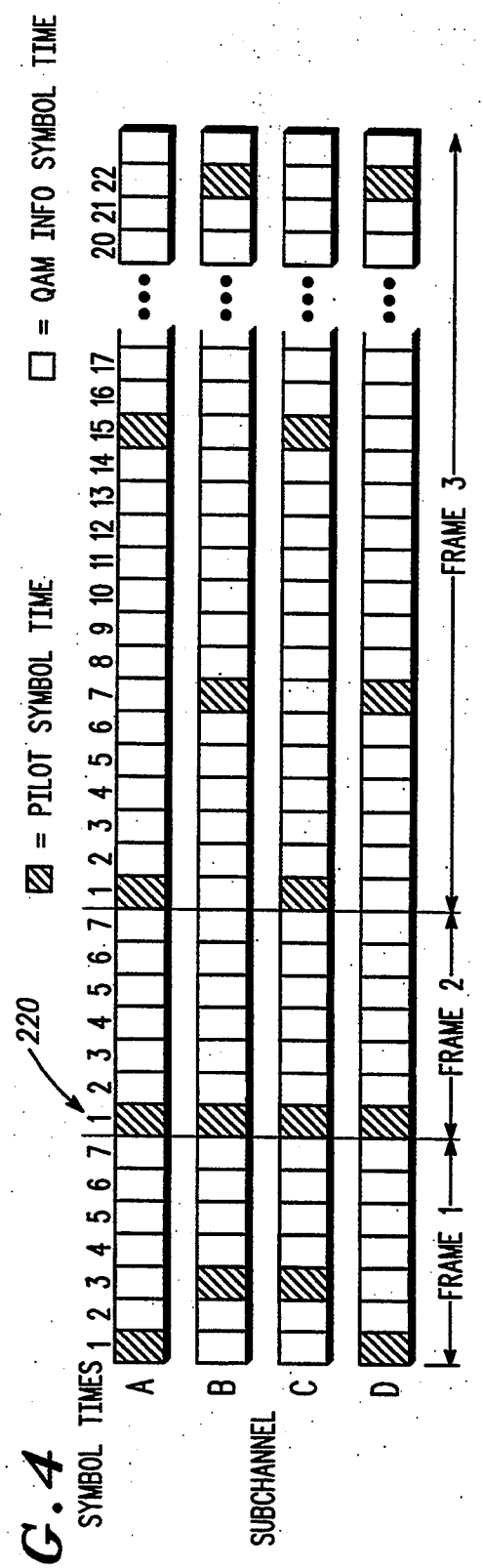
FIG. 4
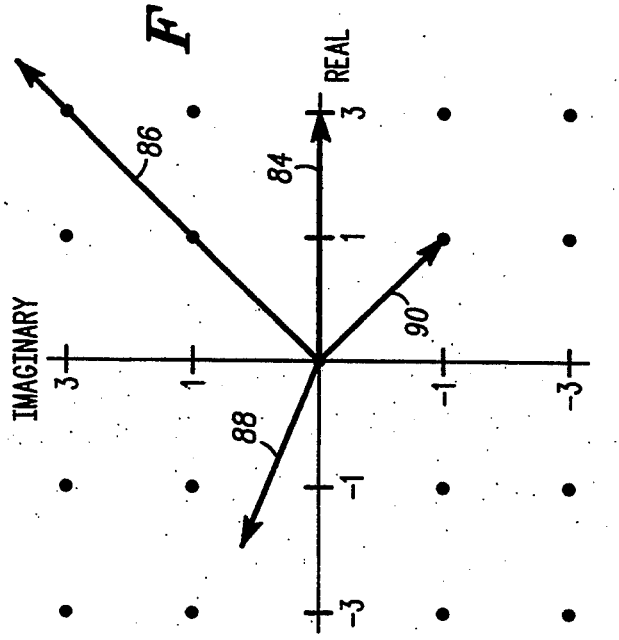
FIG. 5B
FIG. 6

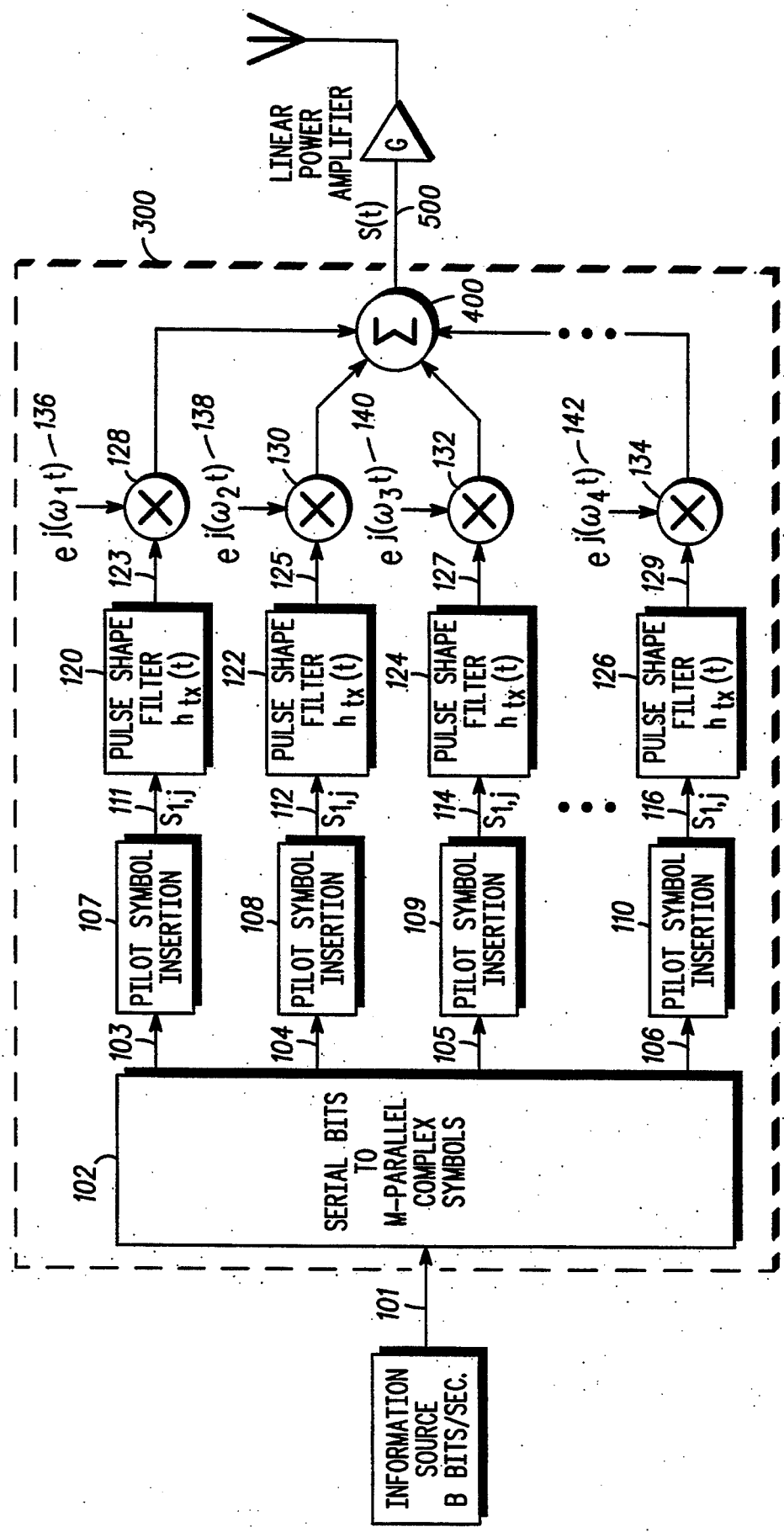

PEAK TO AVERAGE POWER RATIO REDUCTION METHODOLOGY FOR QAM COMMUNICATIONS SYSTEMS

This is a continuation-in-part of Ser. No. 07/536,825, filed Jun. 12, 1990.

FIELD OF THE INVENTION

This invention relates to communications systems. More particularly this invention relates to methods for improving the peak power to average power ratio in a linear modulation communications system particularly a QAM communications system.

BACKGROUND OF THE INVENTION

Various communication systems are known in the art. Pursuant to many such systems, an information signal is modulated on to a carrier signal and transmitted from a first location to a second location. At the second location, the information signal is demodulated and recovered.

Typically, the communication path used by such a system has various limitations, such as bandwidth. As a result, there are upper practical limitations that restrict the quantity of information that can be supported by the communication path over a given period of time. Various modulation schemes have been proposed that effectively increase the information handling capacity of the communication path as measured against other modulation techniques. Sixteen-point quadrature amplitude modulation (QAM) provides a constellation of modulation values (distinguished from one another by each having a different combination of phase and amplitude) wherein each constellation point represents a plurality of information bits.

By virtue of their changing amplitude from QAM-symbol time-to-QAM-symbol time, QAM symbols in a QAM communication system require linear power amplification to be able to accurately distinguish one QAM symbol at one amplitude level and another QAM symbol at some other power level. In a radio communications system, QAM symbols require a very linear amplification prior to broadcasting them on an antenna. In QAM systems, non-linear amplification of QAM symbols in a QAM signal, (which QAM signal is typically considered to be a pulse-shape filtered and frequency up-converted stream of QAM symbols), in a radio transmitter can make coherent demodulation impossible. Another more common problem with using non-linear amplifiers with QAM modulation is the frequency splatter caused by non-linear amplification of a signal. For this reason, linear power amplifiers are required in QAM radio transmitters, which power amplifiers increase in cost, size, and complexity as their output power level and/or linearity increase.

A problem in the design of a linear power amplifier is providing the ability of an amplifier to accommodate widely fluctuating input power levels while producing at its output a faithful reproduction of the input signal. While an amplifier can be readily designed to have a linear power amplification of a relatively constant-amplitude input signal, designing an amplifier that can accommodate a peak power level that might, at any given time, exceed the average power level by several decibels (db) can significantly increase the cost and size of the amplifier.

In QAM communications systems, the ratio of the peak power level to average power level of a QAM symbol stream will usually continuously vary by virtue of the fact that the data represented by the QAM symbols itself varies randomly. Accordingly, power amplifiers for QAM communications systems must be capable of handling a significant peak to average power level ratio and, accordingly, any reduction in the peak to average power ratio eases the requirements of a QAM power amplifier.

Some prior art, single channel QAM systems are frequently transmitted on a communications channel, such as a radio frequency channel, in conjunction with a pilot component. Such pilot components, by constructively or destructively adding with other QAM symbols can at times aggravate the the peak to average power level ratio requirements of a QAM power amplifier, thereby further aggravating the requirements of such an amplifier.

Any methodology by which the ratio of peak power amplitude to average power amplitude is reduced would therefore simplify and reduce the amplifier cost associated with a QAM system and would be an improvement over the prior art.

SUMMARY OF THE INVENTION

In a multi-subchannel, N-level QAM communication system using complex-valued pilot symbols, there is provided herein a method of reducing the ratio of peak to average power by pre-selecting amplitude and/or phase angles for the embedded, complex-valued, pilot symbols added to QAM information symbols, so as to minimize the peak to average power ratio of a composite QAM signal that is transmitted on a communications channel. Such pre-selected pilot symbols include complex-valued symbols that are not part of the well-known constellation of values used in an N-level QAM system, such as the 16 constellation points used in a 16 QAM system. In fact, using the method herein, in a multi-channel, N-level QAM system wherein, over some length of time during which several QAM symbol frames can occur, in addition to have different valued time-coincident pilots in several subchannels, the pilot values in one or more subchannel can also change over this length time. Stated alternatively, pilot values can change both over time and over subchannels to reduce the peak to average power ratio in the composite signal. Frequently at least one pilot symbol will be selected to be off the constellation of values in order to maximally reduce the peak to average power level in the composite signal of a QAM system, which composite signal is comprised of the combination or summation of a plurality of N-level QAM subchannels, which subchannels are in-turn comprised of complex-valued QAM information symbols combined with the complex-valued preselected pilot symbols. In a multi-channel, N-level QAM system, by proper selection of these preselected pilot signals, which are combined with the QAM information symbols (which QAM information symbols include the information of interest to be transmitted) the combined QAM symbols and the preselected pilot can have a substantially lowered peak power level to average power level ratio, compared to prior art systems that use only one or more QAM constellation points for pilot symbols.

In most application of the method herein, and in the embodiment of a QAM transmitter disclosed herein, at least one pilot symbol that is to be combined with a QAM symbol stream, will not lie on the constellation of the QAM symbol. Such a non-constellation-based pilot symbol is considered to be any complex-valued symbol that does not have a phase angle and/or amplitude within pre-determined limits, or ranges, circumscribing the mathematical points on the rectilinear complex plane upon which QAM symbols are identified.

BRIEF DESCRIPTION OF THE DRAWINGS

FIG. 4 shows a graphical representation of the placement of pilot symbols and QAM information symbols in various symbol times, in various time frames in a four subchannel QAM system;

FIG. 5A shows a simplified block diagram of an improved four channel, 16 QAM communications transmitter that provides for improved peak power ratio to average power ratio in a composite S(t) achieved by non-constellation-based pilot symbols;

FIG. 5B shows a simplified representation of the improved pilot and its insertion into the QAM symbol stream.

FIG. 6 shows a graphical representation of a 16-point constellation for a 16 QAM system, and shows examples of both, non-constellation-based pilot symbols and constellation-based pilot symbols.

DETAILED DESCRIPTION OF THE PREFERRED EMBODIMENT

Figure 1:
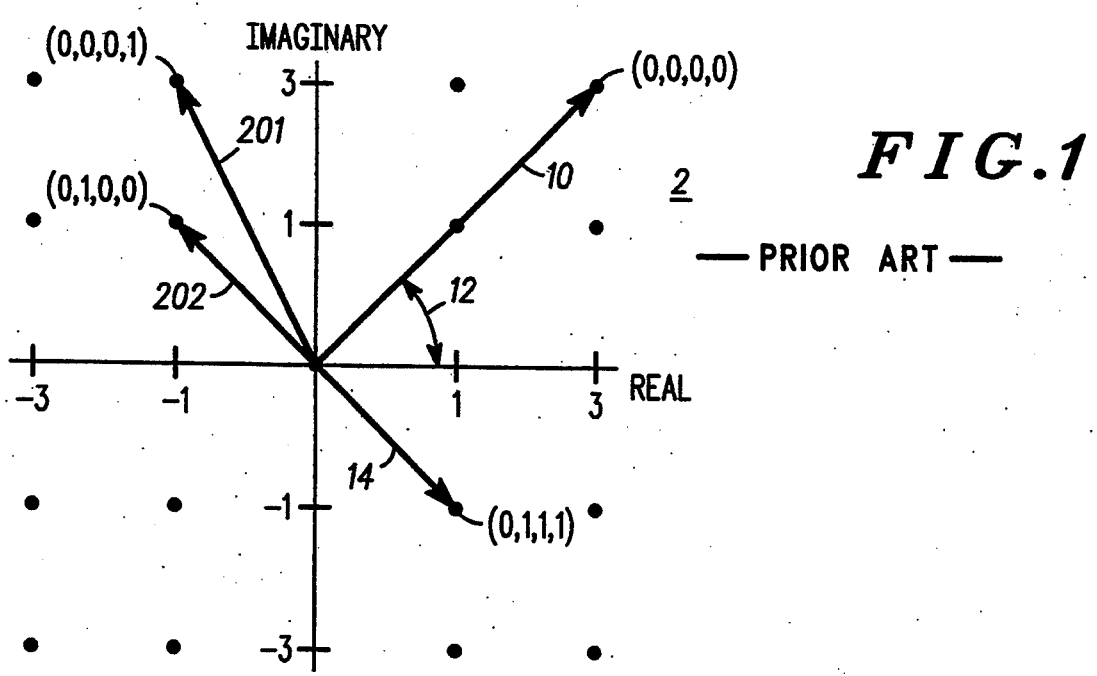
FIG. 1 shows a 16 QAM constellation map.
Figure 2:
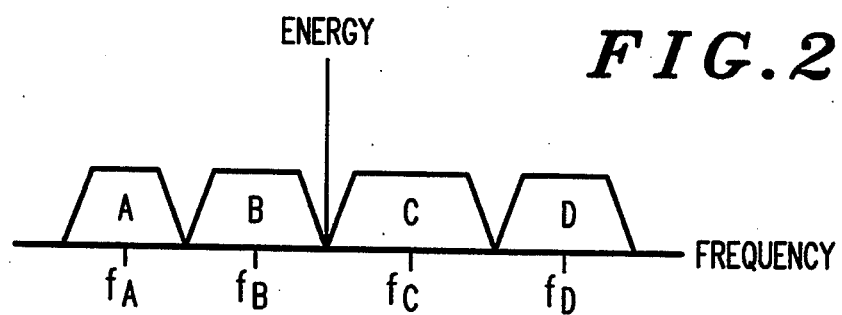
FIG. 2 shows a plot of energy versus frequency for a four subchannel QAM system.
Figure 3:
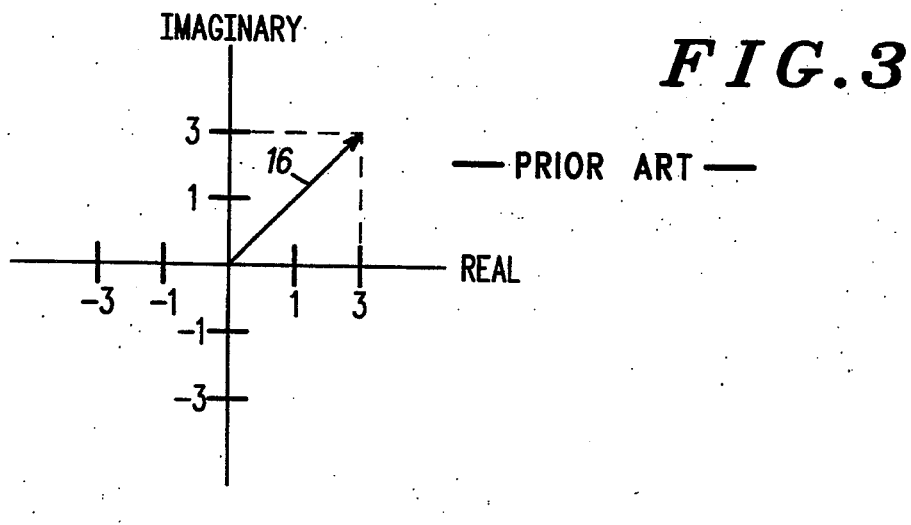
FIG. 3 shows a plot of a prior art QAM pilot symbol.

FIG. 1 shows a constellation for a 16 QAM communication system that is a map of 16 points on the complex plane defined by a horizontal axis representing the real portions, and a vertical axis representing imaginary portions, of a complex number. Transmitted QAM information symbols on a communications channel, (and the pilot symbols as well) are discrete, packets of a carrier signal modulated to convey information using both the amplitude and phase-angle displacement of the carrier from some reference. QAM information symbols are represented on the constellation of FIG. 1 as complex quantities represented as vectors having both magnitude (represented as length) and phase angles (which angles are measured with respect to one of the axes). In a 16 QAM system, having 16 different magnitude and phase angle combinations that correspond to 16 different possible bit patterns of four bindery digits, (which bits are from a serial stream of bits from an information source), each of the 16 points on the constellation is identified as representing one combination of four bits.

A vector (10) (expressed in rectangular coordinates as $3+3j$ and having a length $=(3^2+3^2)^{178}$ and a phase angle (12) equal to the arctan of 3/3 or forty five degrees with respect to the real axis), points to the point {3,3j} on the constellation, which point is shown in FIG. 1 as representing the series of four binary digits, (0,0,0,0). A second QAM symbol (14) points to yet another point $(1, -1j)$ in this constellation and represents four other digital symbols.

From the foregoing, it can be seen that eight bits of information can be represented by two, 16-QAM symbols. When a digital information stream is converted to 16 QAM, four-bit blocks of the data are mapped to the various vectors that correspond to the bit pattern embodied in the four bits. When the QAM symbols that represent the digital information are transmitted, the symbols are transmitted with amplitudes and phase angles that correspond to the magnitudes and phase angles of the vectors used to represent the various patterns, such as those shown for the vectors 10 and 14 depicted in FIG. 1.

FIG. 5A shows a simplified block diagram of a four-channel 16 level QAM (16-QAM) transmitter (100). Though depicted in block diagram format for the convenience of explanation and understanding it should be understood that the invention shown in FIG. 5A, can be practiced in a variety of embodiments; but in particular most of the functions (300) of the preferred embodiment are performed in a digital signal processor such as the Motorola DSP56000 or DSP96000 families. Furthermore, although the embodiment described below is in the context of a 16 QAM amplification it should also be understood that the teachings herein are also applicable to other, multi-subchannel, n-QAM systems.

Referring to FIG. 5A, a processing unit (102) receives an original information signal (101) from an information source. In this particular embodiment, this information signal constitutes a serial bit stream having an effective baud rate of 53.2 kilobits per second. This bit stream can represent, for example, true data, digitized voice, or other appropriate signals.

The processing unit (102) functions to convert groups of 16 serial bits of the original information signal into four 16 QAM complex signal points (symbols). For example, FIG. 1 depicts a 16 QAM complex signal symbol constellation (2). Each symbol from the processing unit is a complex quantity, substantially within the constellation and represents a different combination of four serial bits from the information signal (101). For example, a first one of these symbols (201) represents the bits "0001." A second symbol (202), on the other hand, represents the bits "0100," all in accordance with well understood prior art methodology.

For each serially received 16 original information bits, the processing unit (102) outputs, in parallel, on each of 4 signal paths (103 ∝ 106), an appropriate representative multibit symbol as described above. A pilot insertion unit (107–110), located in each signal path (103–106), inserts a predetermined symbol following receipt of 7 serially received information symbols from the processing unit (102) pursuant to one embodiment of a communication methodology in accordance with the invention. (Other embodiments of the invention would of course include pilot insertion more or less frequently than once every 7 information symbols.) For each serially received 16 original information bits, (from the information signal 101) the processing unit (102) outputs, in parallel on each of the four signal paths (103–106), an appropriate representative multibit symbol as described above.

A reduction in the ratio of peak output power level to average power level in the composite output signal s(t) (500) can be achieved by pre-selecting, in advance, at least the magnitude of, phase angle of, or both, for each of a plurality of the pilot symbols inserted by the pilot insertion units (107, 108, 109, and 110). When these preselected pilots are added to form QAM subchannel symbols streams, (111, 112, 114, and 116) and they are combined by the adder (400), (after they are pulse-shape filtered 120, 122, 124, and 126 and mixed 128, 130, 132, and 134, with an appropriate injection signal 136, 138, 140, and 142 of the form $e^{(2\pi f_{off}Kt)}$, wherein j is the square root of negative one, t is time, and $f_{offk}$ comprises an offset frequency corresponding to the kth composite signal) the composite signal (500) has a reduced peak to average power ratio.

The form of the pilot in the embodiment shown in FIG. 5A is substantially represented by the quantity $P_{i,j} = \rho_{i,j} e^{j\theta}$ i,j, where $\theta_{i,j}$ is the phase of the i'th subchannel pilot at symbol time j and in the preferred embodiment is empirically determined using a computer program, the source code of which is appended below. The determination of the optimum value for the pilot symbols in the preferred embodiment contemplated a fixed QAM symbols frame, which frame is graphically depicted in FIG. 4 as the time period of seven consecutive QAM symbol times (including the pilot symbol time 1) at a nominal carrier frequency ($f_0$ in FIG. 1

In the preferred embodiment, for a given magnitude of pilot, the optimum phase of the injected pilot symbols are calculated. (In a sense, both the magnitude and phase angle are "calculated" by the program. An initial, desired magnitude is supplied to the program by the user and, using this user-supplied quantity, the program calculates optimum phase-angle values, assuming that all other symbols transmitted are zero. Accordingly, in the embodiment of the program below, to select different phase angles and magnitudes, a user must select a different starting magnitude and re-calculate an optimum phase angle value for the new magnitude). Alternate embodiments of the program contemplate including in the calculation of the phase angles and/or magnitudes of the pilots, the effects of the random nature of the QAM information streams (103, 104, 105, 106) upon the peak to average power ratio in the composite signal s(t) (500).

Referring to FIG. 4, there is graphically depicted, the placement and spacing of complex valued pilot symbols that are combined with the complex valued QAM information symbols (103-106 in FIG. 5A) at predetermined symbol times, (A symbol time is typically the time duration of one QAM symbol.) to produce a QAM subchannel signal that is comprised of the complex valued QAM information symbols (103-106) and the complex valued pilots added by the pilot insertion units (107, 108, 109, and 110).

In the embedded pilot sequence shown in FIG. 4, pilot symbols are shown being added in subchannels A and D, in frame 1, at symbol time 1. Pilot symbols are added to the subchannels B and C at symbol time 3 in frame number 1. (Pilots inserted into subchannels during the same symbol time are considered to be time coincident.) In time frame number 2, which depicts an alternate implementation of the pilot symbol insertion, time coincident pilot symbols might just as well be inserted during a single symbol time 1 wherein insertion of the pilots are all time coincident with respect to each other. Frame 3 shows yet another QAM frame, having more than seven symbol times and having time coincident pilots added to at least two channels, every seven symbol times. For purposes of this invention it is preferable that at least two subchannels have so called time coincident pilots and it is yet even more preferable that all subchannels have time coincident pilots but alternate embodiments would contemplate using time coincident pilots in two or more subchannels to further manipulate the peak to average power ratio.

During a finite time period, which period might even be considered the sum of the frame times for frames 1, 2, and 3, at least one pilot symbol, in at least one subchannel, will have a value different from the values of the other pilots. It should be expected that a plurality of the subchannel signals will have a single, or first value and these might be considered fixed-pilot subchannel signals. In at least one other channel, channel B for example, using the method taught herein, during this finite time period (which period might be as short as one symbol time), will have a second value.

In many instances, (depending for example on the number of symbol times in a frame and/or other factors) during a finite length of time, the pilot symbols to be added to a first subchannel at the pilot symbol times therefor, (subchannel A for example) can be selected from a first set of pilot values, and the pilots for a second subchannel signal be selected from a second set of pilot symbol values. The pilots from such a first and second set of values might change in either their order of insertion, their values, or both, to optimally reduce the peak to average ratio for the system. A key feature of the method herein is that in any subchannel, during some finite period of time, pilot symbol values might vary during successive pilot symbol times, in order to reduce the peak to average ratio, of the system, during such length of time.

Referring to FIG. 5A, since the QAM information symbols on lines 103-106 are complex valued quantities, and which represent data, (which data is substantially random over time) the combination of these complex valued quantities by the summation circuit (400) (ignoring momentarily the effect of the inserted pilot symbols) will have a varying peak power level to average power level. This might be appreciated by referring to the constellation map again depicted on FIG. 1. At any particular instant, the output or any one of the QAM information streams might have a QAM symbol that is either identical with or differs from other QAM symbols on the other channels. Upon their combination at the summing circuit (400), over time they will have randomly varying peak power level.

In this invention by appropriate manipulation of the complex valued pilot symbols inserted by the pilot insertion units (107 and 110), the peak power level to average power level ratio in the composite signal s(t), (500) can be substantially reduced, when various probabilistic factors of the data with which they are combined with are considered. Improvements in the peak to average power ratio of 1.5 dB have been realized in at least one embodiment of the invention.

Referring to FIG. 5B a simplified graphical representation of the pilot insertion unit (107-110 in FIG. 5A and which is implemented in a digital signal processor). The improved pilot insertion unit produces pilot symbols that are added to the QAM symbol stream and which can vary substantially anywhere on or off the 16 QAM constellation map shown in FIG. 1. In addition to having the time-coincident pilots of multiple subchannels being different, the magnitude and/or phase of the pilot symbols in each subchannel (A-D for example), can vary from pilot symbol time to pilot symbol time in that subchannel.)

In this invention, while legitimate QAM information symbols will of necessity have to be mapped to one of the 16 constellation points, it is expected using the methodology of this invention that at least one of the pilot symbols that are combined with the QAM information streams (103-106) will not fall on a valid constellation point. Instead, the invention, (which includes the implementation of the apparatus shown in FIG. 5A) contemplates pilots such as those shown in FIG. 6 identified and depicted by reference numerals 84, 86 and 88 which pilots do not fall on valid constellation points, but which when combined with the QAM information streams (103-106) to form piloted QAM subchannel symbol streams (123, 125, 127, and 129), can when combined with the other complex values on the other subchannels to form a composite signal (500) substantially reduce the peak to average power ratio of the composite signal (500). (in addition to using the non-constellation-based pilots 84, 86, and 88, constellation based pilots, such as pilot 90, when appropriately identified, can at appropriate times, also be used to reduce peak to average power ratio.) Both the constellation-based pilot symbols and the non-constellation based pilot symbols are considered to be pre-selected and pre-determined symbols. By virtue of the fact that the pilots occur at discrete instants of time, i.e. one or more QAM symbol times they are considered time domain pilots. In so far as the pilots are spread across the frequencies of the different subchannels, each subchannel of which is centered about a different frequency, the pilots are also considered to have a frequency domain characteristics. In this sense, the pilots can be considered to be both time and frequency domain, and both non-constellation and constellation based, predetermined, complex-valued pilots.

In the preferred embodiment, the phase angle selection for the pilots is accomplished by means of a computer program which is depicted in the attached appendix. It should be appreciated that in other embodiments, a plurality of the pilots might have either their amplitudes and/or their phase angles selected such that when combined with a probablistic determination of permissible QAM information symbols minimizes the peak to average power ratio of the composite signal over some finite length of time. In the embodiment of the apparatus shown in FIG. 5A, at least one of the complex valued pilot symbols that are added to the QAM information symbols by the pilot insertion units (107, 108, 109, and 110) does not lie on the permissible constellation points depicted in either FIGS. 1 or 5.

An exemplary selection process to select these predetermined pilot symbols is described below. The embodiment of program below assumes:

1) a four-subchannel QAM system, having 4, time coincident pilot symbols (220), such as those shown in frame 2 of FIG. 4.
2) that the DSP, in which the apparatus (300) shown in FIG. 5A is embodied, has a simulation sampling rate, $F_s$, (i.e. samples the composite signal s(t)) at 36 times the composite symbol rate.
3) that the subchannel center frequencies are
$\omega_1=2\pi(-3F_s/64)$; $\omega_2=2\pi(-1F_s/64)$;
$\omega_3=2\pi(1F_s/64)$; $\omega_4=2\pi(3F_s/64)$.

The user supplies the program: a slot format file consistent with assumption 1 above; a finite impulse response filter file, which defines the coefficients of the subchannel pulse shape filters 120, 122, 124, 126; the symbol time position of the pilot in a slot for which to carry out the pilot-phase set search; the desired magnitude (squared) of the pilot symbol, (referred to in the program as sync symbols); the number of steps around the unit circle at which to calculate s(t) for each of the four time coincident pilots for which the search is being carried out.

The programs' output is a set of phase angles for (i.e. the $\Theta$'s shown in FIG. 5B) at which the peak transmitter output power is smallest, after calculating peak transmitter output power levels for all the possible combinations of $\Theta$, in the step sizes specified by the user.

While this embodiment of the invention contemplates a particular pilot configuration, i.e. as shown in time frame 2 of FIG. 4, other embodiments contemplate other slot/pilot configurations, such as that shown in frame 1 of FIG. 4 for example. A similar program could well be written by those skilled in the art for any other slot/pilot configuration.

```
define     EXTERN include <stdio.h> include <math.h> include "readlib.h"

include "defcmath.h"

#include "defdsp.h"

main()

{

/*

* Transmitter variables and pointers

*/
```

```
double      fsymb;          /* QAM sub-channel symbol rate
(sps)       */
double      tsymb;          /* QAM sub-channel symbol period
(sec per symb) */
double      ftx;            /* sub-channel TX pulse shape filter
sampling    */
                            /*    rate (ksps)                  */
int     nzst;               /* zero stuff ratio in sub-channel  */
double      ttx;            /* 1/ftx (seconds per sample)
            */
int     nsub;               /* number of QAM sub-channels in system
            */
double      fsc;            /* sub-channel frequency spacing (Hz)
            */
double      wcent[4];       /* sub-channel center frequencies
(nautral)   */
double      tx_ph_st[4];    /* phase step in one sample period
for sub-ch  */
double      tx_phase[4];    /* phase of sub-channel
            */
double      ps_pow;         /* power in pulse shape filter
impulse resp.  */
double      tx_pow;         /* average power at transmitter
output      */
COMPLEX     tx_out;         /* transmitter output
            */
COMPLEX     qam_symb;       /* complex QAM symbol variable
            */
COMPLEX     sub_ch[4];      /* sub-channel data vector
            */
COMPLEX     ps_out[4][144]; /* sub-channel data vector
            */
int     outs;               /* number of filter outputs         */
IDFIR   *tx_pulse[4];       /* pointer to pulse shaping TX filter
strcts      */
int     numb_taps;

double      tx_avg;
```

```
double      tx_scale;
double      max_pow;

int   slot_len;   /* slot length in sub-channel symbols
      */
FILE  *slot_def;  /* slot definition file pointer
      */
int   slot_symb[100];   /* slot symbol definition array
           */ double      amp_pdf[600];
double      pdf_cnt;
int   pdf_index;

long  cnt;
long  sync_length;      /* number of samples simulated per sync
pattern     */
long  steps;            /* number of phase steps for each
variable    */
int   s_symb_cnt; /* sync symbol counter               */
double      phase_step; /* 2pi/steps
      */
double      phi1;
double      phi2;
double      theta1;
double      theta2;
double      s_mag;
double      inv_ns;
COMPLEX     exp_p1;
COMPLEX     exp_p2;
COMPLEX     exp_t1;
COMPLEX     exp_t2;
COMPLEX     mc_exp_t1;
COMPLEX     mc_exp_t2;
COMPLEX     s_symb[4];

double      best[100][6];
```

```
int    numb_pilot;
int    numb_data;
int    numb_dum_p;
int    numb_dum_d;
int    slot_cnt;
double    inv_np;

COMPLEX    sync[1001];
FILTER    *mf[100];
int    mf_len;
COMPLEX    mf_out;
double    max[2];
double    buf[3];
int    pilot[100];
int    pil_loc;

/*
 * general purpose variables and pointers
 */ char   str1[60];    /* general purpose string buffer          */
char   str2[60];    /* general purpose string buffer          */
char   str3[60];    /* general purpose string buffer          */
double    temp;        /* general purpose temporary variable
              */
double    temp2;
double    temp3;
double    pi2;       /* 2.0*pi                                */
double    pi;
long   i,j,k,l,m,n;    /* general purpose counters
      */
COMPLEX    c_temp;             /* complex general purpose temporary
variable    */
COMPLEX    c_temp1;
COMPLEX    c_temp2;
COMPLEX    c_temp3;
```

```
COMPLEX     c_one;              /* 1 + j0 (complex one)
                                */
COMPLEX     c_zero;             /* 0 + j0 (complex zero)
                                */
FILE   *fr, *fr1, *fr2, *fw, *fw1, *fw2;
c_one.real = 1.0;
c_one.imag = 0.0;
c_zero.real = 0.0;
c_zero.imag = 0.0;
pi2 = 8.0*atan(1.0);
pi = 4.0*atan(1.0);

nsub = 4;

fsymb = 4000.0;
tsymb = 1.0/fsymb;
ftx = 144.0;
ttx = 1.0/(ftx*1000.0);
nzst = 36;

fsc = ftx*1000.0/32.0;
temp = -(nsub -.1)*(fsc/2.0);
for ( i = 0; i < nsub; i++ )
{
    wcent[i] = pi2*temp;
    tx_ph_st[i] = wcent[i]*ttx;

temp += fsc;
} again22:
printf("\nEnter the slot definition filename.\n");
scanf("%s", str3);
slot_def = fopen(str3, "r");
if ( slot_def == NULL )
{
    printf("\nFILE ACCESS ERROR, TRY AGAIN.\n");
    goto again22;
```

```
}
fscanf(slot_def, " %d", &slot_len);
if ( slot_len > 90 )
{
    printf("\nMAXIMUM SLOT LENGTH OF 90 SYMBOLS EXCEEDED, TRY
AGAIN./n");
    goto again22;
}
numb_pilot = 0;
numb_data = 0;
numb_dum_p = 0;
numb_dum_d = 0;
slot_cnt = 0;
i = 0;
while( fscanf(slot_def, " %d", &slot_symb[slot_cnt]) != EOF )
{
    if ( slot_symb[slot_cnt] == 0 )
    {
        numb_pilot++;
        pilot[i] = slot_cnt;
        i++;
    }
    else if ( slot_symb[slot_cnt] == 1 )
        numb_data++;
    else if ( slot_symb[slot_cnt] == 2 )
    {
        numb_dum_p++;
        pilot[i] = slot_cnt;
        i++;
    }
    else if ( slot_symb[slot_cnt] == 3 )
        numb_dum_d++;
    slot_cnt++;
}
if ( (slot_cnt != slot_len) ||
     ((numb_pilot+numb_data+numb_dum_p+numb_dum_d) != slot_len) )
{
    printf("\nINVALID SLOT DEFINITION FILE, TRY AGAIN./n");
```

```c
        goto again22;
}
fclose(slot_def);

for ( j = 0; j < i; j++ )
    printf("\nPILOT NUMBER %2d AT SLOT SYMBOL NUMBER %2d.\n", j,
pilot[j]);

printf("\nEnter the slot symbol number of the pilot to
minimize.\n");
scanf("%d", &pil_loc);

again2:
printf("\nEnter the name of the TX pulse shaping filter .COF
file.\n");
scanf("%s", str1);
fr = fopen(str1, "r");
if ( fr == NULL )
{
    printf("\nFILE ACCESS ERROR, TRY AGAIN.\n");
    goto again2;
}
fscanf(fr, " %d, %s", &numb_taps, str2);
ps_pow = 0.0;
for ( j = 0; j < numb_taps; j++ )
{
    fscanf(fr, " %lf", &temp);
    ps_pow += temp*temp;
}
fclose(fr);
for ( m = 0; m < nsub; m++ )
{
    fr = fopen(str1, "r");
    tx_pulse[m] = init_idfirc(fr, nzst, 1);
    fclose(fr);
}
```

```c
printf("\nEnter the sync symbol magnitude squared.\n");
scanf("%lf", &s_mag);

inv_np = (double) (numb_pilot + numb_dum_p - 3) / (double) slot_len;
inv_ns = 3.0 / slot_len;
tx_pow = (ps_pow*4.0/nzst)*
    ((10.0*(1.0 - inv_np - inv_ns)) + (inv_ns*s_mag) +
(inv_np*18.0));
printf("\nAVERAGE POWER AT TX OUTPUT = %7.4f dB.\n",
10.0*log10(tx_pow));
tx_scale = 1.0/sqrt(tx_pow);

printf("\nEnter the number of steps desired around the unit
circle.\n");
scanf("%ld", &steps);

s_mag = sqrt(s_mag);
cnt = 0;
phase_step = pi2/steps;
sync_length = nzst*(pil_loc + 1) + numb_taps;

for ( i = 0; i < 100; i++ )
    best[i][0] = 1.0e10;

/* main calculation loop at 144.0 ksps
    */ for ( i = 0; i < steps; i++ )
{
    phi1 = i*phase_step;
    s_symb[0] = cscale(cexpj(phi1), s_mag);

for ( j = 0; j < steps; j++ )
    {
        phi2 = j*phase_step;
        s_symb[1] = cscale(cexpj(phi2), s_mag);
```

```
    for ( k = 0; k < steps; k++ )
    {
        theta1 = k*phase_step;
        s_symb[2] = cscale(cexpj(theta1), s_mag);

for ( l = 0; l < steps; l++ )
        {
           cnt++;

theta2 = l*phase_step;
           s_symb[3] = cscale(cexpj(theta2), s_mag);

for ( m = 0; m < nsub; m++ )
               tx_phase[m] = 0.0;

s_symb_cnt = -1;
           max_pow = -1;

for ( m = 0; m < sync_length; m++ )
           {
              if ( (m % nzst) == 0 )
              {
                    s_symb_cnt++;

for ( n = 0; n < nsub; n++ )
                    {
                        if ( s_symb_cnt == pil_loc )
                            qam_symb = s_symb[n];
                        else
                            qam_symb = c_zero;

ridfir1c(qam_symb, tx_pulse[n],
                                 &ps_out[n][0], &outs);
                        sub_ch[n] =
cmult(cexpj(tx_phase[n]),
                                    ps_out[n][m%nzst]);
                        sub_ch[n] = cscale(sub_ch[n],
(1.0/nzst));
```

```
                        tx_phase[n] += tx_ph_st[n];
                        tx_phase[n] = fmod(tx_phase[n],
pi2);
                    }
                }
                else
                {
                    for ( n = 0; n < nsub; n++ )
                    {
                        sub_ch[n] =
cmult(cexpj(tx_phase[n]),
                                ps_out[n][m%nzst]);
                        sub_ch[n] = cscale(sub_ch[n],
(1.0/nzst));

tx_phase[n] += tx_ph_st[n];
                        tx_phase[n] = fmod(tx_phase[n],
pi2);
                    }
                } tx_out = c_zero;
                for ( n = 0; n < nsub; n++ )
                    tx_out = cadd(tx_out, sub_ch[n]);

tx_out = cscale(tx_out, tx_scale);

temp = cmag(tx_out);
                    temp2 = temp*temp;
                    if(temp2 > max_pow)
                        max_pow = temp2;
            } n = 100;
            for ( m = 99; m >= 0; m-- )
            {
                if ( max_pow < best[m][0] )
                    n--;
```

```
                    }
                    if ( n < 100 )
                    {
                        for ( m = 99; m > n; m-- )
                        {
                            best[m][0] = best[m-1][0];
                            best[m][1] = best[m-1][1];
                            best[m][2] = best[m-1][2];
                            best[m][3] = best[m-1][3];
                            best[m][4] = best[m-1][4];
                        }
                        best[n][0] = max_pow;
                        best[n][1] = phi1;
                        best[n][2] = phi2;
                        best[n][3] = theta1;
                        best[n][4] = theta2;
                    }

}

}

}

}
} if ( cnt > 20 )
    cnt = 20;

fw = fopen("best_pilot.dat", "w");
fprintf(fw, "\n\n          QUAD_PILOT_SRCH RESULTS :\n\n");
fprintf(fw, "\nTX PSF : %-30s", str1);
fprintf(fw, "\nSLOT DEFINITION FILE : %-30s", str3);
fprintf(fw, "\nSYNC MAGNITUDE SQUARED = %4.2f", s_mag*s_mag);
fprintf(fw, "\nPILOT LOCATION = %2d", pil_loc);
fprintf(fw, "\nNUMBER OF PHASE STEPS PER VARIABLE = %d", steps);
fprintf(fw, "\nTOTAL PHASE COMBINATIONS TESTED = %8d\n",
steps*steps*steps*steps);

printf("\n\n          QUAD_PILOT_SRCH RESULTS :\n\n");
printf("\nTX PSF : %-30s", str1);
```

```c
printf("\nSLOT DEFINITION FILE : %-30s", str3);
printf("\nSYNC MAGNITUDE SQUARED = %4.2f", s_mag*s_mag);
printf("\nPILOT LOCATION = %2d", pil_loc);
printf("\nNUMBER OF PHASE STEPS PER VARIABLE = %d", steps);
printf("\nTOTAL PHASE COMBINATIONS TESTED = %8d\n",
steps*steps*steps*steps);

printf("\n\nPEAK POWER    PHI0    PHI1    PHI2    PHI3\n\n");
fprintf(fw, "\n\nPEAK POWER    PHI1    PHI2    THETA1    THETA2\n\n");
for ( i = 0; i < cnt; i++ )
{
    printf("   %5.3f   %6.3f   %6.3f   %6.3f   %6.3f\n",
best[i][0],
        best[i][1]*180.0/pi, best[i][2]*180.0/pi,
best[i][3]*180.0/pi,
        best[i][4]*180.0/pi);
    fprintf(fw, "   %5.3f   %6.3f   %6.3f   %6.3f   %6.3f\n",
best[i][0],
        best[i][1]*180.0/pi, best[i][2]*180.0/pi,
best[i][3]*180.0/pi,
        best[i][4]*180.0/pi);
}
fclose(fw);

}
```

```
/*
**
**    INCLUDE FILES
**
**/
```

```c
#include <defcmath.h>

/*******************************************************************
************/
/*********************************** cadd
***********************************/
/*******************************************************************
************/

COMPLEX cadd( COMPLEX x , COMPLEX y )     /*  x + y  */
{
    COMPLEX temp;
    temp.real = x.real + y.real;
    temp.imag = x.imag + y.imag;
    return(temp);
}

/*******************************************************************
************/
/*********************************** ccmpr
***********************************/
/*******************************************************************
************/
BOOL    ccmpr( COMPLEX x , COMPLEX y )    /*   x == y ?   */
{
    return( (x.real==y.real)&&(x.imag==y.imag) );
}

/*******************************************************************
************/
/*********************************** cconjg
***********************************/
/*******************************************************************
************/

COMPLEX cconjg( COMPLEX x )    /*   x conjugate   */
{
    COMPLEX  temp;
```

```
        temp.real = x.real;
        temp.imag = -x.imag;
        return(temp);
}

/*******************************************************************
************/
/********************************* cdiv
**********************************/
/*******************************************************************
************/

COMPLEX cdiv( COMPLEX x , COMPLEX y )        /*   x / y        */
{
    COMPLEX   temp;
    double    densqr = y.real * y.real + y.imag * y.imag ;

temp.real = ( x.real * y.real + x.imag * y.imag ) / densqr ;
    temp.imag = ( x.imag * y.real - x.real * y.imag ) / densqr ;
    return(temp);
}

/*******************************************************************
************/
/********************************* cexp
**********************************/
/*******************************************************************
************/

COMPLEX cexp( COMPLEX x )              /*    exp (x)    */
{
    double   temp = exp( x.real )  ;
    x.real = temp * cos( x.imag )  ;
    x.imag = temp * sin( x.imag )  ;
    return(x);
}

/*******************************************************************
```

```
************/
/******************************* cexpj
*********************************/
/*****************************************************************
************/

COMPLEX cexpj( double c )        /*   exp ( j*c )   */
{
    COMPLEX  temp;
    temp.real = cos( c ) ;
    temp.imag = sin( c ) ;
    return(temp);
}

/*****************************************************************
************/
/******************************* clog
*********************************/
/*****************************************************************
************/

COMPLEX clog( COMPLEX x )        /*  log e (x)   */
{
    COMPLEX   temp;
    temp.real = 0.5 * log( x.real * x.real + x.imag * x.imag );
    temp.imag = atan2( x.imag , x.real ) ;
    return(temp);
}

/*****************************************************************
************/
/******************************* cmac
*********************************/
/*****************************************************************
************/

COMPLEX cmac( COMPLEX x , COMPLEX y , COMPLEX z )   /*  x + y * z
*/
```

```
{
    x.real += ( y.real * z.real - y.imag * z.imag ) ;
    x.imag += ( y.real * z.imag + y.imag * z.real ) ;
    return(x);
}

/*******************************************************************
************/
/******************************* cmag
*********************************/
/*******************************************************************
************/ double  cmag( COMPLEX x )              /*   |x|   */
{
    return( sqrt( x.real * x.real + x.imag * x.imag ) );
}

/*******************************************************************
************/
/******************************* cmagdb
*********************************/
/*******************************************************************
************/ double  cmagdb( COMPLEX x )            /*   20 log 10 |x|   */
{
    double  magsqr;
    magsqr = x.real * x.real + x.imag * x.imag;
    if (magsqr <= 0.0)
       return( -999.0 );
    else
       return( 10.0 * log10( magsqr ) );
}

/*******************************************************************
************/
/******************************* cmagsqr
```

```c
double   cmagsqr( COMPLEX x )              /*    |x|^2     */
{
    return( x.real * x.real + x.imag * x.imag );
}
```

/******************************************************************
************/
/******************************* cmix
*********************************/
/******************************************************************
************/

```c
COMPLEX cmix( COMPLEX x , double c )      /*   x * exp( j*c )   */
{
    double   _cos = cos(c);
    double   _sin = sin(c);
    double   temp = x.real;

x.real = temp * _cos - x.imag * _sin ;
    x.imag = temp * _sin + x.imag * _cos ;

return(x);
}
```

/******************************************************************
************/
/******************************* cmplx
*********************************/
/******************************************************************
************/

```c
COMPLEX cmplx( double a , double b )     /*   a + jb   */
{
    COMPLEX  temp;
```

```
    temp.real = a;
    temp.imag = b;
    return(temp);
}
```

/******************************************************************
************/
/********************************* cmsc
**********************************/
/******************************************************************
************/

```
COMPLEX cmsc( COMPLEX x , COMPLEX y , COMPLEX z )    /*  x - y*z  */
{
    x.real -= ( y.real * z.real - y.imag * z.imag ) ;
    x.imag -= ( y.real * z.imag + y.imag * z.real ) ;
    return(x);
}
```

/******************************************************************
************/
/********************************* cmult
**********************************/
/******************************************************************
************/

```
COMPLEX cmult( COMPLEX x , COMPLEX y )         /*  x * y  */
{
    COMPLEX  temp;
    temp.real = x.real * y.real - x.imag * y.imag ;
    temp.imag = x.real * y.imag + x.imag * y.real ;
    return(temp);
}
```

/******************************************************************
************/
/********************************* cpolar
**********************************/

```c
/******************************************************************
*************/

COMPLEX cpolar( COMPLEX x )     /* rect to polar */
{
    COMPLEX  temp;
    temp.MAG = sqrt( x.real * x.real + x.imag * x.imag ) ;
    temp.PHASE = ( temp.MAG > 0.0
            ? atan2( x.imag , x.real )
            : 0.0  );              /* arbitrary choice for case Mag=0   */
    return(temp);
}

/******************************************************************
************/
/*********************************** cpow
**********************************/
/******************************************************************
************/

COMPLEX cpow( COMPLEX x , double c )    /*   x ** c   */
{
    COMPLEX   expnt;
    double    etoreal;

/*   expnt  =  c  *   COMPLEX_log ( x )  */ expnt.real = c * 0.5 * log( x.real * x.real + x.imag * x.imag );
    expnt.imag = c * atan2( x.imag , x.real ) ;

/*   expnt  =  complex_log ( expnt )    */ etoreal = exp( expnt.real ) ;

expnt.real = etoreal * cos( expnt.imag ) ;
    expnt.imag = etoreal * sin( expnt.imag ) ;
```

```
    return(expnt);

}

/*******************************************************************
************/
/********************************* crect
***********************************/
/*******************************************************************
************/

COMPLEX crect( COMPLEX x )          /*   polar to rect */
{
    COMPLEX   temp;
    temp.real = x.MAG * cos ( x.PHASE ) ;
    temp.imag = x.MAG * sin ( x.PHASE ) ;
    return(temp);
}

/*******************************************************************
************/
/********************************* csac
***********************************/
/*******************************************************************
************/

COMPLEX csac( COMPLEX x , COMPLEX y , double c )   /*  x + y * c
*/
{
    x.real += ( y.real * c ) ;
    x.imag += ( y.imag * c ) ;
    return(x);
}

/*******************************************************************
************/
/********************************* cscale
***********************************/
```

```
/*******************************************************************
*************/

COMPLEX cscale( COMPLEX x , double c )    /*   x * c */
{
    x.real *= c ;
    x.imag *= c ;
    return(x);
}

/*******************************************************************
*************/
/******************************* csub
************************************/
/*******************************************************************
*************/

COMPLEX csub( COMPLEX x , COMPLEX y )    /*   x - y */
{
    x.real -= y.real ;
    x.imag -= y.imag ;
    return(x);
}
```

---

```
#ifndef __DEFCMATH
define __DEFCMATH ifndef __MATH
include <math.h>
endif ifndef __STANDARDS
include <standards.h>
#endif
```

```c
/* Basic complex data structure: */ typedef struct { double real; double imag; } COMPLEX;

define MAG real
#define PHASE imag

/* Complex arithmetic functions: */ extern COMPLEX cadd( COMPLEX x , COMPLEX y );          /*  x + y       */
extern BOOL    ccmpr( COMPLEX x , COMPLEX y );         /*  x == y ?    */
extern COMPLEX cconjg( COMPLEX x );                    /*  x conjugate */
extern COMPLEX cdiv( COMPLEX x , COMPLEX y );          /*  x / y       */
extern COMPLEX cexp( COMPLEX x );                      /*  exp(x)      */
extern COMPLEX cexpj( double c );                      /*  exp( j * c )*/
extern COMPLEX clog( COMPLEX x );                      /*  ln(x)       */
extern COMPLEX cmac( COMPLEX x , COMPLEX y , COMPLEX z ); /* x + y * z */
extern double  cmag( COMPLEX x );                      /*  |x|         */
extern double  cmagdb( COMPLEX x );                    /*  20 log 10 |x| */
extern double  cmagsqr( COMPLEX x );                   /*  |x|^2       */
extern COMPLEX cmix( COMPLEX x , double c );           /*  x * exp( j*c ) */
extern COMPLEX cmplx( double a , double b );           /*  a + jb      */
extern COMPLEX cmsc( COMPLEX x , COMPLEX y , COMPLEX z ); /* x - y*z  */
extern COMPLEX cmult( COMPLEX x , COMPLEX y );         /*  x * y
```

```
*/
extern COMPLEX cpolar( COMPLEX x );              /* rect to
polar  */
extern COMPLEX cpow( COMPLEX x , double c );     /* x ** c
*/
extern COMPLEX crect( COMPLEX x );               /* polar to
rect   */
extern COMPLEX csac( COMPLEX x , COMPLEX y , double c ); /* x +
y * c      */
extern COMPLEX cscale( COMPLEX x , double c );   /* x * c
*/
extern COMPLEX csub( COMPLEX x , COMPLEX y );    /* x - y
*/

/*  COMPLEX macros which accomplish the above without function
calls */

/*  Complex ADD:   x = y + z  */ define  CADD(x,y,z)   x.real = y.real + z.real ; \
                 x.imag = y.imag + z.imag ;

/*  Complex DIVide:   x = y/z  */ define  CDIV(x,y,z) { COMPLEX _y, _z ; \
             _y = y; _z = z; \
             x.imag = _z.real*_z.real+_z.imag*_z.imag ; \
             x.real =
(_y.real*_z.real+_y.imag*_z.imag)/x.imag ; \
             x.imag = (_y.imag*_z.real-
_y.real*_z.imag)/x.imag ; }

/*  Complex exp {j(phi)}:   x = exp(j*c)   where c is a scalar!!!
*/ define   CEXPJ(x,c)   x.real = cos( c ) ; \
```

```
                        x.imag = sin( c ) ;

/*  Complex Multiply ACcumulate:   x = x + (y*z)    */ define  CMAC(x,y,z)  { COMPLEX _y, _z; \
                _y = y; _z = z; \
                x.real += _y.real*_z.real - _y.imag*_z.imag ; \ x.imag += _y.real*_z.imag + _y.imag*_z.real ; }

/*  Complex    MIX:   x = x * exp(j*c)    where c is a scalar!!!  */ define  CMIX(x,c)    { double   __cos = cos(c) ; \
                double   __sin = sin(c) ; \
                   double    __temp = x.real ; \
                x.real = __temp * __cos - x.imag * __sin ; \
                x.imag = __temp * __sin + x.imag * __cos ; }

/*  CoMPLeX  from two reals:  x = (a + jb)  */ define     CMPLX(x,a,b)   x.real = a ; \
                x.imag = b ;

/*  Complex Multiply SubtraCt    x = x - (y*z)   */ define  CMSC(x,y,z) { COMPLEX _y, _z; \
                _y = y; _z = z; \
                x.real -= (_y.real*_z.real - _y.imag*_z.imag) ; \ x.imag -= (_y.real*_z.imag + _y.imag*_z.real) ;
}

/*  Complex MULTiply:   x = y * z  */
```

```
#define  CMULT(x,y,z)  { COMPLEX _y, _z; \
                _y = y; _z = z; \
                x.real = _y.real*_z.real - _y.imag*_z.imag ; \
                x.imag = _y.real*_z.imag + _y.imag*_z.real ; }
/*  Complex Scale ACcumulate:  x = x + (y*c)    */ define  CSAC(x,y,c)  { COMPLEX _y; \
                _y = y; \
                x.real += _y.real * c ; \
                x.imag += _y.imag * c ; }

/*  Complex SCALE:  x = y * c   where c is a scalar!!!  */ define  CSCALE(x,y,c)    x.real = y.real * c ; \
                x.imag = y.imag * c ;

/*  Complex SUBtract:  x = y - z   */ define  CSUB(x,y,z)    x.real = y.real - z.real ; \
                x.imag = y.imag - z.imag ;

#endif
```

---

```
#ifndef __DEFDSP
define __DEFDSP ifndef __STANDARDS
include <standards.h>     /*  standard Research header file  */
endif ifndef __DEFCMATH
include <defcmath.h>      /*  Complex math header file       */
#endif
```

```c
#ifndef __FILE
#include <stdio.h>        /* Standard I/O header file        */
endif /* Basic Filter data structure */ struct SectionStruct { char type;       /*  N  or  D       */
                int   numcof;    /*  # of coeff    */
                int   start;     /*  read pointer */
                COMPLEX *coeff;  /*  coeff array  */
                COMPLEX *data;   /*  data array   */
                struct SectionStruct *nextsec; };

typedef struct SectionStruct SECTION;

typedef struct { BOOL direct;      /*  = 1 if filter is direct
form FIR */
          SECTION *firstsec; } FILTER;

/*  unit variance COMPLEX uniform noise sample */ define UNIFORM(a)   a.real = \
rand() / 876706527.6868518720945379550407 -
1.2247448713915890490986420373S3; \
            a.imag = \
rand() / 876706527.6868518720945379550407 -
1.2247448713915890490986420373S3;

/******************************************************************
************/
/*********************   functions in DSPLIB
**************************/
/******************************************************************
************/ extern  COMPLEX gauss();
```

/* returns one unit variance, zero mean, COMPLEX Gaussian sample */ extern void   ipfftc( COMPLEX data[] , int sign , int m);

/* In-Place, FFT (Complex) correct order input and output, no scaling.  */
   /* Sign determines the direction, use the macros INVERSE and FORWARD in */
   /* the calling program.  m is log base 2 of the number of points.       */ define INVERSE  1     /* specifies "inverse" FFT */
define FORWARD  0     /* specifies "forward" FFT */ extern  void FreeFilter( FILTER *f );

extern  FILTER  *readcof(FILE *FilePtr);

/* reads a .cof file into a FILTER structure and returns a */
   /* pointer to this structure (NULL if an error occurred) */ extern  FILTER  *CopyFilter( FILTER *x );

/* duplicates the filter x and returns a pointer to the newly */
   /* allocated filter. */ extern  void  writecof( FILTER *FilterPtr, FILE *FilePtr );

/* writes the FILTER structure pointed to by FilterPtr to the */
   /* file pointed to by FilePtr in .COF form.  (writes to screen */

```
/* if FilePtr = NULL
*/ extern  void  clear_filter( FILTER *FilterPtr );

/* Zeros out all memory locations within the specified FILTER
*/
    /*      structure.                                          */ extern  COMPLEX  filter1c( COMPLEX  seed , FILTER  *FilterPtr);
    /* Performs general purpose digital filtering.  FilterPtr
should */
    /* point to a filter read in by "readcof" and seed is the
next    */
    /* input point.  The function "returns" the output of the
filter. */ extern  void  filterNc( COMPLEX input[], int num, FILTER
*FilterPtr,
                        COMPLEX  output[] );

/* Performs general purpose digital filtering.  FilterPtr
should */
    /* point to a filter read in by "readcof" and input is an
array   */
    /* of COMPLEX input points, num is the number of such points.
*/
    /* Output is an array where the num outputs will be stored,
which */
    /* can be the same as the input array.
*/ extern  BOOL  FIRDeqI( COMPLEX  input[], int  NumIn, int  I,
FILTER *FilterPtr,
                        COMPLEX output[] ) ;
```

/* performs direct form FIR filtering where I = interp ratio */
/* ( = dec ratio !!! ). Unnecessary multiply-accumulates and */
/* outputs are NOT computed. NOTE: this works on FILTER */
/* structures, not IDFIR structures!  input is a COMPLEX array */
/* containing NumIn samples to be filtered. output is where the */
/* outputs will be stored (may be the same as input) */

/* Structure for Efficient Single-section, Interpolating/Decimating FIR's */

```
struct IDFirStruct {
    int numcof;        /* # of coefficients */
    int numdata;    /* # of delay line elements */
    int coeffIndex;    /* current index into filter */
    int dataIndex;    /* current index into filter delay line */
    int interp;        /* interpolation ratio */
    int decim;        /* decimation ratio */
    COMPLEX *coeff;    /* coefficient array */
    COMPLEX *data;    /* input data array */
};
typedef struct IDFirStruct IDFIR;

extern IDFIR *init_idfirc(
    FILE *FilePtr,int inte,int dec);
```
/* */
/* Funtion: */
/* Allocates memory for and then initializes the Interpolating/ */
/* Decimating FIR filter structure. */

```
/*    Arguments:                                              */
/*            1) a pointer to an open coefficient file,
              */
/*            2) an integer interpolation ratio, and
       */
/*            3) an integer decimation ratio.
*/

/*    Function value:                                         */
/*            A pointer to the new filter structure.
              */
/*                                                            */ extern void idfir1c(
    COMPLEX sample,IDFIR *idfirPtr,COMPLEX *dataOut,int *numOut);
/*                                                            */
/*    Funtion:                                                */
/*            Performs efficient interpolation/decimation
filtering.        */
/*        Given one COMPLEX filter input "sample", output
samples         */
/*        are computed and returned in the "dataOut[]" array.
Since the  */
/*        number of elements returned in the array may vary
between       */
/*        successive calls to this filtering routine, the number
of        */
/*        new elements in the "dataOut[]" array is returned in
the         */
/*        argument "numOut".
*/

/*    Arguments:                                              */
/*            1) a COMPLEX filter input,
*/
/*            2) a pointer to the IDFIR filter structure,
*/
/*            3) a pointer to an array of COMPLEX filter
outputs, and       */
```

```
        /*         (array memory must be allocated in the calling
program)     */
        /*      4) a pointer to the integer number of filter
outputs computed.   */
        /*  Function value:                                      */
        /*        None.                                          */
        /*                                                       */ extern void ridfir1c(
    COMPLEX sample,IDFIR *RfirPtr,COMPLEX *dataOut,int *numOut);
        /*                                                       */
        /* This program is identical to idfir1c() except it assumes
that the   */
        /* filter has only real coefficients.  In this case, ridfir1c
*/
        /* is much more efficient than idfir1c because it eliminates
the    */
        /* COMPLEX multiplies.
*/
        /*                                                       */ endif
```

---

```
/*
**
**   INCLUDE FILES
**
**/ define EXTERN extern include <defdsp.h>
include <readlib.h>
```

```c
define MODINC(x,c)  x = ( x + 1 ) % c ;       /* modulo increment */ define MODDEC(x,c)  x = ( x - 1 + c ) % c ;   /* modulo decrement */ extern  void FreeSection( SECTION *section );

/******************************************************************/
/*********************** gauss ************************************/
/******************************************************************/

/*
**
** MACRO DEFINITIONS
**
**/ define   NORM    3037000499.268942911264841    /* = SQRT(2) * (2**31 - 0.5) */
define   DC      12884901882.0                 /* = 12 * ( ave of rand() ) */

/*
**++
** FUNCTIONAL DESCRIPTION:
**
**      Generates COMPLEX unity variance Gaussian noise.
**
** FORMAL PARAMETERS:
**
**      none
**
** FUNCTIONAL VALUE:
**
```

```
**      one sample from a zero-mean unit-variance COMPLEX Gaussian
process.
**
**--
**/

COMPLEX gauss()

{

/*  Local Variables */ int        index;
    COMPLEX temp;
    temp.real = (temp.imag = DC) ;

for (index = 1;  index <= 12;  index++)
      {
      temp.real += rand();
      temp.imag += rand();
      } temp.real /= NORM ;
    temp.imag /= NORM ;

return(temp);

}

/*******************************************************************
**/
/******************** ipfftc
********************************/
/*******************************************************************
**/

/*
```

```
**++
**  FUNCTIONAL DESCRIPTION:
**
**      Performs a complex FFT (or inverse FFT) adapted from Oppenheim &
**      Schafer, p.332, fig. p6.5 . . . Decimation-in-frequency, normal-order
**      input and output.  No scaling (e.g.  1/N) is performed in either
**      direction.
**
**  FORMAL PARAMETERS:
**
**      data   =  input (and output) array of COMPLEX data structures
**      sign   =  FFT direction:  +1 = IFFT, other = FFT
**      m      =  log base 2 (number of points), i.e. N = 2 ** m
**
**--
**/ void  ipfftc( COMPLEX data[] , int sign , int m)

{

/*  Local Variables */

COMPLEX  u,w,t,temp;
    int      n,l,le,le1,ip,i,j,nv2,nm1,k;

n = (int) (0.5 + pow( 2.0 , ((double) m) ));      /* n = 1.0 * (2 ** m)  */
    for (l=1;  l<=m;   l++)
    {
      le = (int) (0.5 + pow( 2.0 , ((double) m + 1 - l) ) );
      le1 = le / 2;
      CMPLX ( u, 1.0 , 0.0 )
      CMPLX ( w, cos(PI/le1) , -sin(PI/le1) )
```

```
        for (j=1; j<=le1; j++)
           {
           for (i=j; i<=n; i+=le)
              {
              ip = i + le1;
              CADD( t, data[i], data[ip] )
              if (sign == INVERSE)
                 {
                 CSUB( temp, data[i], data[ip] )
                 CDIV( data[ip], temp, u )
                 }
              else
                 {
                 CSUB( temp, data[i], data[ip] )
                 CMULT( data[ip], temp, u )
                 }
              data[i] = t;
              }
           CMULT( temp, u, w );
           u = temp;
           }
        }

/* Bit reversal: */ nv2 = n / 2 ;
nm1 = n - 1 ;
j = 1;
for (i=1; i<=nm1; i++)
   {
   if (i < j)
      {
      t = data[j];
      data[j] = data[i];
      data[i] = t;
      }
   k = nv2 ;
   while (k < j)
```

```
            {
            j -= k ;
            k /= 2 ;
            }
        j += k;
        }
}

/*******************************************************************
**/
/*********************** readcof
***************************/
/*******************************************************************
**/

/*
**++
**  FUNCTIONAL DESCRIPTION:
**
**      Reads a .COF file into a Filter data structure.
**
**  FORMAL PARAMETERS:
**
**      fileptr =  pointer to .COF file
**
**  FUNCTION VALUE:
**
**      pointer to the newly created Filter data structure or NULL if
**         the input file is erroneous in any way.
**
**--
**/

FILTER  *readcof( FILE *FilePtr )

{
```

```c
/* Local Variables */

FILTER  *FilterPtr;
    SECTION *CurSecPtr;
    COMPLEX *CurCofPtr;
    char    TempType;
    int     TempNumCoeff;
    int     index;

/* allocate a new filter */

FilterPtr = CALLOC(1,FILTER);
    if (FilterPtr == NULL)
       {
       printf("Insufficient Memory in readcof!%c\n",BELL);
       return(NULL);
       }

/* allocate first section */ if ( freadcofhdr(FilePtr, &TempNumCoeff, &TempType) != EOF)
       {
       FilterPtr->firstsec = CALLOC(1,SECTION);
       if ( FilterPtr->firstsec == NULL )
           {
           printf("Insufficient Memory in readcof!%c\n",BELL);
           return(NULL);
           }
       }
    else
       {
       printf("No sections in coefficient file: readcof!%c\n",BELL);
       return(NULL);
       }

CurSecPtr = FilterPtr->firstsec;
    if ( TempType == EOS )
```

```
   {
   printf("Invalid section header:  readcof!%c\n",BELL);
   return(NULL);
   }
else
   CurSecPtr->type = TempType;

CurSecPtr->numcof = TempNumCoeff ;
CurSecPtr->data = CALLOC(TempNumCoeff,COMPLEX) ;
CurSecPtr->coeff = CALLOC(TempNumCoeff,COMPLEX) ;

if ( (CurSecPtr->data == NULL) || (CurSecPtr->coeff == NULL) )
   {
   printf("Insufficient Memory in readcof!%c\n",BELL);
   return(NULL);
   }
else
   CurCofPtr = CurSecPtr->coeff ;

for (index=0;  index <= TempNumCoeff-1;  index++)
   {
   if ( FREADCMPLX(FilePtr,CurCofPtr[index]) == EOF )
      {
      printf("Unexpected end-of-file:  readcof!%c\n",BELL);
      return(NULL);
      }
   }

/*  read each successive section  */ while (freadcofhdr(FilePtr, &TempNumCoeff, &TempType) != EOF)
      {
      CurSecPtr->nextsec = CALLOC(1,SECTION) ;
      CurSecPtr = CurSecPtr->nextsec ;

if (CurSecPtr == NULL)
         {
         printf("Insufficient Memory in readcof!%c\n",BELL);
```

```
            return(NULL);
        } if ( TempType == EOS)
        {
        printf("Invalid section header:  readcof!%c\n",BELL);
        return(NULL);
        }
    else
        CurSecPtr->type = TempType;

CurSecPtr->numcof = TempNumCoeff ;
    CurSecPtr->data  = CALLOC(TempNumCoeff,COMPLEX) ;
    CurSecPtr->coeff = CALLOC(TempNumCoeff,COMPLEX) ;

if ( (CurSecPtr->data == NULL) || (CurSecPtr->coeff == NULL)
)
        {
        printf("Insufficient Memory in readcof!%c\n",BELL);
        return(NULL);
        }
    else
        CurCofPtr = CurSecPtr->coeff ;

for (index=0;  index <= TempNumCoeff-1;  index++)
        {
        if ( FREADCMPLX(FilePtr,CurCofPtr[index]) == EOF )
            {
            printf("Unexpected end-of-file:  readcof!%c\n",BELL);
            return(NULL);
            }
        }
    }              /*  end of section while loop  */

/*  Determine if filter is Direct Form FIR  */ if (  (FilterPtr->firstsec->nextsec == NULL) &&
      (FilterPtr->firstsec->type == 'N')   )
```

```
        FilterPtr->direct = 1;

return(FilterPtr);   /*  successful exit point */

}

/*
 *
 * Functional Description:
 *
 *      Frees (releases) the memory associated with a FILTER
structure
 *
 * Formal Parameters:
 *
 *      FILTER *f - pointer to the filter to be freed
 *
 */ void FreeFilter( FILTER *f )
{
  FreeSection( f->firstsec );
  free( f );
}

/*
 *
 * Functional Description:
 *
 *      Frees (releases) the memory of one SECTION of a filter,
recursively
 *
 * Formal Parameters:
 *
 *      SECTION *f - pointer to the filter to be freed
 *
 */
```

```
void FreeSection( SECTION *section )
{
  if ( section->nextsec != NULL )
    FreeSection( section->nextsec );

free( section->coeff );
  free( section->data );
  free( section );
}
```

```
/*******************************************************************
*****/
/*********************** CopyFilter
***************************/
/*******************************************************************
*****/

/*
 *
 * Functional Description:
 *
 *      Reads a .COF file into a Filter data structure.
 *
 * Formal Parameters:
 *
 *      x =  pointer to a valid FILTER (one read by readcof, e.g.)
 *
 * Function Value:
 *
 *      pointer to the newly created Filter data structure which is a
 *      duplicate of the filter that is passed.
 *
 *
 */

FILTER  *CopyFilter( FILTER *x )
```

{

```
/* Local Variables */

FILTER  *y;
SECTION *XSecPtr;
SECTION *YSecPtr;

/* allocate a new filter */ if ( x == NULL )
   {
     printf("NULL filter pointer passed to CopyFilter()!%c\n",
BELL);
     return( NULL );
   } y = MALLOC(1,FILTER);
if ( y == NULL )
   {
     printf("Insufficient Memory in CopyFilter()!%c\n",BELL);
     return(NULL);
   }

*y = *x;   /* copy the filter `header' */

XSecPtr = x->firstsec;
YSecPtr = y->firstsec;

/* Copy each section giving the new filter a private data array
*/
/* but using the same coefficient array as the original filter.
*/ while ( XSecPtr != NULL )
   {
     YSecPtr = MALLOC(1,SECTION);
     if ( YSecPtr == NULL )
```

```c
        {
            printf("Insufficient Memory in CopyFilter()!%c\n",BELL);
            return(NULL);
        }
        *YSecPtr = *XSecPtr;
        YSecPtr->data = CALLOC(YSecPtr->numcof,COMPLEX);

XSecPtr = XSecPtr->nextsec;
        YSecPtr = YSecPtr->nextsec;
    } return( y );   /*  successful exit point */

}
/*
 *
 * Functional Description:
 *
 *      Zeros out all the internal memory of a FILTER structure.
 *
 * Formal Parameters:
 *
 *      FilterPtr = pointer to the desired FILTER structure
 *
 * Function Value:
 *
 *      none
 *
 *
 */ void   clear_filter( FILTER *FilterPtr )

{

SECTION *SectionPtr;
    COMPLEX *DataPtr;
```

```
    COMPLEX   zero;
    int       index;
    int       number;

if ( FilterPtr == NULL ) return;
    zero.real = (zero.imag = 0.0);

SectionPtr = FilterPtr->firstsec;

while ( SectionPtr != NULL )
      {
      number = SectionPtr->numcof;
      DataPtr = SectionPtr->data;
      for ( index = 0; index < number; index++ )
          DataPtr[index] = zero;
      SectionPtr = SectionPtr->nextsec;
      } return;

}

/*******************************************************************
**/
/********************  writecof
*****************************/
/*******************************************************************
**/

/*
**++
** FUNCTIONAL DESCRIPTION:
**
**     Writes a Filter data structure to an output file
**
** FORMAL PARAMETERS:
**
```

```
**        fileptr =  pointer to output file
**
**--
**/ void  writecof( FILTER *FilterPtr, FILE *FilePtr )
{

/* Local Variables */

SECTION  *CurSecPtr;
   COMPLEX  *CurCofPtr;
   int       index;

/* Write the first section */

CurSecPtr = FilterPtr->firstsec;
   CurCofPtr = CurSecPtr->coeff;

if (FilePtr != NULL)
       fprintf(FilePtr, FMTOCOF, CurSecPtr->numcof, CurSecPtr->type);
   else
      printf(FMTOCOF, CurSecPtr->numcof, CurSecPtr->type);

for (index=0;  index < CurSecPtr->numcof;  index++)
     {
     if (FilePtr != NULL)
         fprintf(FilePtr, FMTOSSC, CurCofPtr[index]);
     else
         printf(FMTOSSC, CurCofPtr[index]);
     }

/* Write all successive sections  */ while ( (CurSecPtr = CurSecPtr->nextsec) != NULL )
     {
     CurCofPtr = CurSecPtr->coeff;
```

```
        if ( FilePtr != NULL )

fprintf(FilePtr, FMTOCOF, CurSecPtr->numcof, CurSecPtr->type);
        else
            printf(FMTOCOF, CurSecPtr->numcof, CurSecPtr->type);

for (index=0;  index < CurSecPtr->numcof;  index++)
        {
            if (FilePtr != NULL)
                fprintf(FilePtr, FMTOSSC, CurCofPtr[index]);
            else
                printf(FMTOSSC, CurCofPtr[index]);
        }

}

}

/*******************************************************************/
/******************** filterlc
*******************************/
/*******************************************************************/

/*
**++
** FUNCTIONAL DESCRIPTION:
**
**      Performs general purpose digital filtering.  You pass it a pointer
**      to a FILTER structure (see defjds.h) and a COMPLEX filter seed
**      (i.e. the input data point), and it will return the filter output.
```

```
**       This routine does no interpolation or decimation.
**
**   FORMAL PARAMETERS:
**
**       seed     =  input data point   (COMPLEX)
**       FilterPtr =  pointer to a FILTER structure
**
**   FUNCTION VALUE:
**
**       the output of the filter    (COMPLEX)
**
**--
**/

COMPLEX   filter1c( COMPLEX   seed , FILTER   *FilterPtr)

{
    /*  Local Variables */

SECTION *CurSecPtr;
    COMPLEX *CurCofPtr;
    COMPLEX *CurDatPtr;
    COMPLEX accum;
    register int    count;
    register int    DataIndex;
    int       N;
    int       begin;

CurSecPtr = FilterPtr->firstsec;

while (CurSecPtr != NULL)
        { if (CurSecPtr->type == 'N' )               /* Numerator section: */
```

```
            {
            N = CurSecPtr->numcof;           /* number of coeff. */
            DataIndex = CurSecPtr->start;    /* data starting point
*/
            CurDatPtr = CurSecPtr->data;     /* data array    */
            CurDatPtr[DataIndex] = seed;     /* store the filter
seed */
            CurCofPtr = CurSecPtr->coeff;    /* coeff array   */
            CMPLX(accum, 0.0 , 0.0 )         /* initialize
accumulator */
            for (count=0;  count < N;  count++)
              {
              CMAC(accum, CurCofPtr[count], CurDatPtr[DataIndex])
              MODDEC(DataIndex,N)     /* modulo decrement data
index    */
              }
            seed = accum;          /* seed = this section's output */
            MODINC(CurSecPtr->start,N)    /* modulo increment
starting point */
            } else                              /* Denominator section: */

{
            N = CurSecPtr->numcof;           /* number of coeff. */
            DataIndex = CurSecPtr->start;    /* data starting point
*/
            MODINC(CurSecPtr->start,N)    /* modulo increment
starting point */
            CurDatPtr = CurSecPtr->data;     /* data array    */
            CurCofPtr = CurSecPtr->coeff;    /* coeff array   */
            accum = seed;                    /* initialize accumulator */
            for (count=1;  count < N;  count++)
              {
              CMSC(accum, CurCofPtr[count], CurDatPtr[DataIndex])
              MODDEC(DataIndex,N)     /* modulo decrement data
index    */
              }
```

```
        CDIV(seed,accum,CurCofPtr[0])    /* seed = y[k] = accum
/ b0 */

CurDatPtr[CurSecPtr->start] = seed;  /* store y[k] in
array */
        }

CurSecPtr = CurSecPtr->nextsec;

}                   /* end of while loop */ return(seed);  /* successful exit point */

}
```

```
/*******************************************************************/
/********************  filterNc
*******************************/
/*******************************************************************/

/*
**++
** FUNCTIONAL DESCRIPTION:
**
**      Performs general purpose digital filtering.  You pass it a pointer
**      to a FILTER structure (see defjds.h) and a COMPLEX input array pointer
**      and it will fill up the 'output' array pointer with the num outputs.
**      This routine does no interpolation or decimation.
**
** FORMAL PARAMETERS:
**
**      input    = array of input data points   (COMPLEX)
```

```
**      num      = number of points to be filtered
**      FilterPtr = pointer to a FILTER structure
**      output   = array where outputs will be stored (COMPLEX, can be same
**                              as input!)
**
**--
**/ void filterNc( COMPLEX input[], int num, FILTER *FilterPtr, COMPLEX output[])

{

/* Local Variables */

SECTION *CurSecPtr;
    COMPLEX *CurCofPtr;
    COMPLEX *CurDatPtr;
    COMPLEX accum;
    COMPLEX seed;
    register int    count;
    register int    DataIndex;
    int     loop;
    int     N;
    int     begin;

for ( loop = 0; loop < num; loop++ )
    {

CurSecPtr = FilterPtr->firstsec;
       seed = input[loop] ;

while (CurSecPtr != NULL)
       { if (CurSecPtr->type == 'N' )            /* Numerator section: */
```

```
{
    N = CurSecPtr->numcof;          /* number of coeff. */
    DataIndex = CurSecPtr->start;   /* data starting point */

CurDatPtr = CurSecPtr->data;    /* data array */
    CurDatPtr[DataIndex] = seed;    /* store the filter seed */

CurCofPtr = CurSecPtr->coeff;   /* coeff array */
    CMPLX(accum, 0.0 , 0.0 )        /* initialize accumulator */
    for (count=0; count < N; count++)
      {
        CMAC(accum, CurCofPtr[count], CurDatPtr[DataIndex])
        MODDEC(DataIndex,N)    /* modulo decrement data index */
      }
    seed = accum;            /* seed = this section's output */
    MODINC(CurSecPtr->start,N)   /* modulo increment starting point */
} else                          /* Denominator section: */
{
    N = CurSecPtr->numcof;          /* number of coeff. */
    DataIndex = CurSecPtr->start;   /* data starting point */

MODINC(CurSecPtr->start,N)   /* modulo increment starting point */
    CurDatPtr = CurSecPtr->data;    /* data array */
    CurCofPtr = CurSecPtr->coeff;   /* coeff array */
    accum = seed;                   /* initialize accumulator */
    for (count=1; count < N; count++)
      {
        CMSC(accum, CurCofPtr[count], CurDatPtr[DataIndex])
        MODDEC(DataIndex,N)    /* modulo decrement data index */
      }
}
```

```
            CDIV(seed,accum,CurCofPtr[0])     /* seed = y[k] = accum
/ b0 */

CurDatPtr[CurSecPtr->start] = seed;  /* store y[k] in
array */

}

CurSecPtr = CurSecPtr->nextsec;

}                       /* end of while loop */ output[loop] = seed ;

}                           /* end of for loop */ return ;        /* successful exit point */

}
/*******************************************************************
**/
/********************** FIRDeqI
*******************************/
/*******************************************************************
**/

/*
**++
**  FUNCTIONAL DESCRIPTION:
**
**      Performs smart FIR filtering where interpolation and decimation
**      ratios are equal (but not necessarily unity!). The unnecessary
**      multiply accumulates are not computed and unnecessary outputs are
**      also not computed.
**
** FORMAL PARAMETERS:
**
```

```
**       input[]   =  COMPLEX array of 'NumIn' input points
**       NumIn     =  number of input points
**       I         =  interpolation ratio ( = decimation ratio !!! )
**       *FilterPtr = pointer to a FILTER structure (must be direct form FIR)
**       output[]  =  array of output samples
**
** FUNCTIONAL VALUE:
**
**       returns FALSE if filter is not direct for FIR, otherwise it returns
**       TRUE.
**
**--
**/

BOOL  FIRDeqI( COMPLEX  input[], int  NumIn, int  I, FILTER *FilterPtr,
                                        COMPLEX output[] )

{

/*  Local Variables */ int     N = FilterPtr->firstsec->numcof ;
    int     loop;
    register  int  count;
    register  int  DataIndex;

COMPLEX accum;
    COMPLEX *coeff = FilterPtr->firstsec->coeff ;
    COMPLEX *data  = FilterPtr->firstsec->data ;

if ( FilterPtr->direct == FALSE ) return(FALSE);

for( loop = 0; loop < NumIn; loop++ )
```

```
        {

MODINC( FilterPtr->firstsec->start , N )   /* Modulo
increment start */
    DataIndex = FilterPtr->firstsec->start ;   /*    location */
    CSCALE(data[DataIndex],input[loop],I)      /*  Place new point
in data
                                                          buffer
scale by interp
                                                    ratio   */
    CMPLX( accum , 0.0 , 0.0 )    /*   initialize accumulator */ for( count = 0; count < N; count += I )
        {
        CMAC( accum , coeff[count] , data[DataIndex] )
        MODDEC( DataIndex , N )
        } output[loop] = accum ;

}             /* end of for loop */ return(TRUE) ;   /* successful exit point */

}

/*
 *    INTERPOLATING/DECIMATING FIR ROUTINES
 *
 *  DESCRIPTION:
 *    The following routines have been designed to efficiently
 *    implement single section, double or COMPLEX coefficient,
 *    interpolating/decimating FIRs that operate on COMPLEX data.
 *    Descriptions of the currently available IDFIR routines are
 *    listed below.
 *
 *    1) IDFIR *init_idfirc(FilePtr,inte,dec)
 *          COMPLEX (or double) coefficients, COMPLEX data
```

```
*       This subroutine allocates the required buffers for
filtering.
*         It takes the arguments:
*           FilePtr - a pointer to an OPEN coefficient file.
*               *NOTE*: filter should have number of taps that
*               is a multiple of the interpolation ratio.
*           inte ---- integer interpolation ratio
*           dec  ---- integer decimation ratio
*         It returns a pointer to a IDFIR (Interpolating/
*         Decimating FIR) structure.
*
*     2) void ridfir1c(sample,RfirPtr,dataOut,&numOut)
*           double coefficients, COMPLEX data
*         This subroutine performs interpolation/decimation
filtering.
*         It takes four arguments:
*           sample --- complex value that is the next entry into
the filter
*                 delay line
*           RfirPtr -- ptr IDFIR structure.
*           dataOut -- ptr to an array of complex filter outputs
*           &numOut -- ptr to integer number of new elements in
dataOut array
*                 *NOTE*: the maximum number of filter outputs
at
*                 any given call to this subroutine is
(inte/dec+1).
*         It returns no value. The filter output is stored
*           inside the array dataOut and the number of good
elements
*         that the array contains in returned in numOut.
*
*     3) void idfir1c(sample,RfirPtr,dataOut,&numOut)
*           COMPLEX coefficients, COMPLEX data
*         This subroutine performs interpolation/decimation
filtering.
*         It takes four arguments:
```

```
*            sample --- complex value that is the next entry into the filter
*                        delay line
*            RfirPtr -- ptr IDFIR structure.
*            dataOut -- ptr to an array of complex filter outputs
*            &numOut -- ptr to integer number of new elements in dataOut array
*                       *NOTE*: the maximum number of filter outputs at
*                       any given call to this subroutine is (inte/dec+1).
*       It returns no value. The filter output is stored
*         inside the array dataOut and the number of good elements
*       that the array contains in returned in numOut.
*
*
*    (THIS STRUCTURE IS DEFINED IN <defdsp.h>)
*    struct IDFirStruct {
*    int numcof;            # of coefficients
*    int numdata;           # of delay line elements
*    int coeffIndex;        current index into filter
*    int dataIndex;         current index into filter delay line
*    int interp;            interpolation ratio
*    int decim;             decimation ratio
*    COMPLEX *coeff;        coefficient array
*    COMPLEX *data;         input data array
*    };
*    typedef struct IDFirStruct IDFIR;
*/

IDFIR *init_idfirc(FILE *FilePtr,int inte,int dec)
{
  IDFIR *CfirPtr;
  int i,TempNumCoeff;
  char TempType;
```

```c
/* get filter coefficients */

CfirPtr = (IDFIR *)calloc(1,sizeof(IDFIR));

if (CfirPtr == NULL)
   {
      printf("Insufficient Memory in init_idfir!%c\n",BELL);
      return(NULL);
   } if (FilePtr == NULL)
   {
      printf("Invalid coefficient file: init_idfir!%c\n",BELL);
      return(NULL);
   } if (freadcofhdr(FilePtr,&TempNumCoeff,&TempType)==EOF)
   {
      printf("No coefficients in coefficient file:
init_idfir!%c\n",BELL);
      return(NULL);
   } if (TempType != 'n' && TempType != 'N')
   {
      printf("Invalid section header: init_idfir!%c\n",BELL);
      return(NULL);
   }

/* initialize parameters of IDFIR data structure */

CfirPtr->numdata = TempNumCoeff/inte;
CfirPtr->numcof = TempNumCoeff;
CfirPtr->interp = inte;
CfirPtr->decim = dec;
CfirPtr->coeffIndex = inte;
CfirPtr->dataIndex = 0;
CfirPtr->coeff = (COMPLEX
```

```c
*)calloc(TempNumCoeff,sizeof(COMPLEX));
   CfirPtr->data = (COMPLEX *)calloc(CfirPtr->numdata,sizeof(COMPLEX));

if (CfirPtr->data == NULL || CfirPtr->coeff == NULL)
      {
         printf("Insufficient Memory in init_idfir!%c\n",BELL);
         return(NULL);
      } for (i=0; i< TempNumCoeff; i++)
      {
         if (FREADCMPLX(FilePtr,CfirPtr->coeff[i]) == EOF)
           {
              printf("Unexpected end-of-file: init_idfir!%c\n",BELL);
              return(NULL);
           }
      } for (i=0; i<CfirPtr->numdata; i++)
      {
         CMPLX(CfirPtr->data[i],0.0,0.0)
      }

/* Make sure filter is DIRECT FORM!!   (added by JDS)   */ if ( freadcofhdr(FilePtr,&TempNumCoeff,&TempType) != EOF )
      {
         printf("Filter must be direct form FIR in init_idfir().%c\n",BELL);
         return(NULL);
      }
   return(CfirPtr);

}

/*******************************************************************
*************/
```

```c
void ridfir1c(COMPLEX sample,IDFIR *RfirPtr,COMPLEX *dataOut,int *numOut)
{
    int i,j,k;
    COMPLEX temp;

/* decrement  pointer into filter delay line and add new sample */

MODDEC(RfirPtr->dataIndex,RfirPtr->numdata);
    RfirPtr->data[RfirPtr->dataIndex]=sample;

/* update initial index into the table of filter taps */ if (RfirPtr->coeffIndex < RfirPtr->interp)
       RfirPtr->coeffIndex += RfirPtr->decim - RfirPtr->interp;
    else RfirPtr->coeffIndex -= RfirPtr->interp;

if (RfirPtr->coeffIndex<RfirPtr->interp) {

/* In this case it is possible to compute at least one filter output. */
       /* The first filter output is computed here. */

CMPLX(dataOut[0],0.0,0.0)
       for (j=RfirPtr->dataIndex,i=RfirPtr->coeffIndex;
            i<RfirPtr->numcof;
            i += RfirPtr->interp) {
            CSAC(dataOut[0],RfirPtr->data[j],RfirPtr->coeff[i].real);
            MODINC(j,RfirPtr->numdata);
       }
       CSCALE(dataOut[0],dataOut[0],(double)RfirPtr->interp);
       *numOut=1;
    }
    else {

/* In this case, more input samples are required before any
```

```
*/
    /* output samples can be computed, so empty the dataOut
array.*/

*numOut=0;
      return;
    } while (1) {

/* Continue computing filter outputs as long as the
initial    */
        /* coefficient index remains less than the interpolation
ratio.*/
        /* (After computing each filter output, the initial
coefficient*/
        /* index is incremented by the decimation ratio.)
*/

RfirPtr->coeffIndex += RfirPtr->decim;
        if (RfirPtr->coeffIndex < RfirPtr->interp) {
            CMPLX(dataOut[*numOut],0.0,0.0)
          for (j=RfirPtr->dataIndex,i=RfirPtr->coeffIndex;
            i<RfirPtr->numcof; i += RfirPtr->interp) {
            CSAC(dataOut[*numOut],RfirPtr->data[j],(RfirPtr-
>coeff[i].real));
              MODINC(j,RfirPtr->numdata);
          }

CSCALE(dataOut[*numOut],dataOut[*numOut],(double)RfirPtr->interp);
          (*numOut)++;
      }
      else {
          RfirPtr->coeffIndex -= RfirPtr->decim;
          return;
      }
    }
}
```

```
/****************************************************************
************/ void idfir1c(COMPLEX sample,IDFIR *CfirPtr,COMPLEX *dataOut,int
*numOut)
{
    int i,j,k;
    COMPLEX temp;

/* decrement  pointer into filter delay line and add new
sample */

MODDEC(CfirPtr->dataIndex,CfirPtr->numdata);
    CfirPtr->data[CfirPtr->dataIndex]=sample;

/* update initial index into the table of filter taps */ if (CfirPtr->coeffIndex < CfirPtr->interp)
      CfirPtr->coeffIndex += CfirPtr->decim - CfirPtr->interp;
    else CfirPtr->coeffIndex -= CfirPtr->interp;
    if (CfirPtr->coeffIndex<CfirPtr->interp) {

/* In this case it is possible to compute at least one
filter output. */
      /* The first filter output is computed here. */

CMPLX(dataOut[0],0.0,0.0);
      for (j=CfirPtr->dataIndex,i=CfirPtr->coeffIndex;
          i<CfirPtr->numcof; i += CfirPtr->interp) {
            CMAC(dataOut[0],CfirPtr->data[j],CfirPtr->coeff[i]);
            MODINC(j,CfirPtr->numdata);
      }
      CSCALE(dataOut[0],dataOut[0],(double)CfirPtr->interp);
      *numOut=1;
    }
    else {

/* In this case, more input samples are required before any
```

```
    /* output samples can be computed, so empty the dataOut
array.*/

*numOut=0;
    return;
    } while (1) {

/* Continue computing filter outputs as long as the
initial    */
        /* coefficient index remains less than the interpolation
ratio.*/
        /* (After computing each filter output, the initial
coefficient*/

/* index is incremented by the decimation ratio.)
*/

CfirPtr->coeffIndex += CfirPtr->decim;
        if (CfirPtr->coeffIndex < CfirPtr->interp) {
            CMPLX(dataOut[*numOut],0.0,0.0)
            for (j=CfirPtr->dataIndex,i=CfirPtr->coeffIndex;
                i<CfirPtr->numcof; i += CfirPtr->interp) {
                    CMAC(dataOut[*numOut],CfirPtr->data[j],CfirPtr-
>coeff[i]);
                MODINC(j,CfirPtr->numdata);
            }

CSCALE(dataOut[*numOut],dataOut[*numOut],(double)CfirPtr->interp)
            (*numOut)++;
        }
        else {
            CfirPtr->coeffIndex -= CfirPtr->decim;
            return;
        }
```

}
    }

```
/* Module Contains:    rinit, readd, readi, ropen, freadnd, */
/*                     read, freadcofhdr, [@function name@]... */

/*
**
**   INCLUDE FILES
**
**/ define EXTERN extern include <readlib.h>
include <string.h>
include <stdarg.h> ifdef VMS
include <stdlib.h>
#include <ssdef.h>
#include <starlet.h>
#include <jpidef.h>
#include <lnmdef.h>
#include <descrip.h>
#endif

/*
**
**   MACRO DEFINITIONS
**
```

**/

```c
#define NOT     !
#define EXIT    exit(1)
#define FOREVER for(;;)
#define MAXRECORD 512
#define ERASE 0x7F
#define EOS   0x00
#define TAB   0x09
#define LF    0x0A
#define CR    0x0D
#define EXP     ( _line[_index] == 'e' || _line[_index] == 'E' || \
                  _line[_index] == 'd' || _line[_index] == 'D' )
#define END     ( _line[_index] == EOS || _line[_index] == CR || \
_line[_index] == LF )
#define NOTEND  ( _line[_index] != EOS && _line[_index] != CR && \
_line[_index] != LF )
#define ADIGIT     ( digit >= 0 && digit <= 9 )
#define NOTADIGIT  ( digit < 0 || digit > 9 )
#define WHITESPACE ( _line[_index] == ' ' || _line[_index] == TAB \
)
#define ENTERLOGMODE  ( _line[_index] == '?' && \
          ( _line[_index+1] == 'l' || _line[_index+1] == 'L' ) && \
          ( _line[_index+2] == 'o' || _line[_index+2] == 'O' ) && \
          ( _line[_index+3] == 'g' || _line[_index+3] == 'G' ) && \
          ( _line[_index+4] == EOS ) \
)
#define SWITCHENTRYMODE ( _line[_index] == '?' && \
          ( _line[_index+1] == 'S' || _line[_index+1] == 's' ) && \
          ( _line[_index+2] == 'W' || _line[_index+2] == 'w' ) && \
          ( _line[_index+3] == 'I' || _line[_index+3] == 'i' )
```

```
                && \
                        ( _line[_index+4] == 'T' || _line[_index+4] == 't' )
                && \
                        ( _line[_index+5] == 'C' || _line[_index+5] == 'c' )
                && \
                        ( _line[_index+6] == 'H' || _line[_index+6] == 'h' )
                && \
                        ( _line[_index+7] == EOS )
        )
#define TOGGLEENTRYMODE ( _line[_index] == '?' && \
                        ( _line[_index+1] == 'T' || _line[_index+1] == 't' )
                && \
                        ( _line[_index+2] == 'O' || _line[_index+2] == 'o' )
                && \
                        ( _line[_index+3] == 'G' || _line[_index+3] == 'g' )
                && \
                        ( _line[_index+4] == 'G' || _line[_index+4] == 'g' )
                && \
                        ( _line[_index+5] == 'L' || _line[_index+5] == 'l' )
                && \
                        ( _line[_index+6] == 'E' || _line[_index+6] == 'e' )
                && \
                        ( _line[_index+7] == EOS )
        )
#define _MAXPARAMLEN 512
#define MAXNODE 32
#define MAXDEVICE 128
#define MAXPATH 128
#define MAXNAME 32
#define MAXTYPE 16
define MAXVERSION 16 define INITFILENAME(a) \
a.node[0] = EOS; \
a.device[0] = EOS; \
a.path[0] = EOS; \
a.name[0] = EOS; \
a.type[0] = EOS; \
```

```
a.version[0] = EOS;

#define SYS$INPUT_FILESPEC "SYS$INPUT:.;"
#define SYS$COMMAND_FILESPEC "SYS$COMMAND:.;"

#define CRLF_TO_EOS \
if ( (_LineFeed = strchr(&_line[_index],LF)) != NULL ) \
    *_LineFeed = EOS;                                  \
if ( (_LineFeed = strchr(&_line[_index],CR)) != NULL ) \
    *_LineFeed = EOS;

#define WARN(a)   fprintf(_SYS$OUTPUT, "%s%c\n\n", a, BELL )

/*
**
** TYPEDEF's
**
**/ typedef struct { short int   buffer_length ;
            short int   item_code ;
            long int    *buffer_address ;
            long int    return_length_address ; } ITMLST;

typedef struct { char node[MAXNODE+1];
            char device[MAXDEVICE+1];
            char path[MAXPATH+1];
            char name[MAXNAME+1];
            char type[MAXTYPE+1];
            char version[MAXVERSION+1]; } FILENAME;

/*
**
** global function definitions for this module:
**
**/
```

```c
extern BOOL    IsTerminal( char *LogicalName );
extern BOOL    file_parse( FILENAME *name , char *string );
extern void    old_file_parse( FILENAME *name , char string[] );
extern char    *apply_defaults( FILENAME *input, FILENAME *defaultfn
);
extern BOOL    readx( char *prompt, char *type );

#ifndef VMS
extern char *getenv( char *name );
#endif

/*
**
**   global variables for this module:
**
**/ char *_LineFeed;
char _line[512];
char _DefaultPrompt[128];
int  _index;
/****************************************************************
************/
/******************************* rinit
*****************************/
/****************************************************************
************/

/*
**++
**   FUNCTIONAL DESCRIPTION:
**
**       Parses command line and redefines stdin if necessary
**
**   FORMAL PARAMETERS:
**
**       argc, argv
```

```
**
**   FUNCTION VALUE:
**
**        none
**
**--
**/ void rinit( int argc, char *argv[] )

{
    static  BOOL  FirstCall = TRUE;

int   i;
    char  *filename;
    char  *anotherparam;
    char  tempchar;
    char  CharBuff[256];
    FILE  *TempFilePtr;

#ifdef VMS          /*  define item list for SYS$JPI_MODE  */

ITMLST  item[2] = { {4, JPI$_MODE, &_process_mode, 0},
                        {0, 0, 0, 0}  };
endif if ( NOT FirstCall )
       {
       printf("Programming error, rlib initialization already performed.%c\n",
                BELL);
       EXIT;
       }

_Initialized = TRUE;
    FirstCall = FALSE;

#ifdef  VMS     /*  set defaults based on job type  */
```

```
    sys$getjpiw(0, 0, 0, item, 0, 0, 0);

if (_process_mode == JPI$K_INTERACTIVE)
      {
      _VerbMode = FALSE;
      _PromptMode = TRUE;
      }
    else
      {
      _PromptMode = TRUE;
      _VerbMode = TRUE;
      } else    /*  if not VMS, set defaults as follows:  */

_VerbMode = FALSE;
    _PromptMode = TRUE;

#endif

_ToggleInEffect = FALSE;
    _LogFilePtr = NULL;
    _CommandFileMode = FALSE;
    _LogMode = FALSE;
    _SYS$INPUT = stdin;
#ifdef VMS
    _SYS$COMMAND = ( stdcom = fopen(SYS$COMMAND_FILESPEC, "r")  )
;
#else
    _SYS$COMMAND = ( stdcom = stdin );
#endif
    _SYS$OUTPUT = stdout;
    _SYS$ERROR = stderr;

/* parse command line switches */ ifdef VMS

_UnknownSwitches = 0;
```

```
for ( i=1; i<argc; i++ )

{ top:
    anotherparam = argv[i] + 1 ;
    anotherparam = strpbrk( anotherparam , "/" );

if ( strncmp(argv[i],"/c=",3)==0 ||
         strncmp(argv[i],"/co=",4)==0 ||
         strncmp(argv[i],"/com=",5)==0 ||
         strncmp(argv[i],"/comm=",6)==0 ||
         strncmp(argv[i],"/comma=",7)==0 ||
         strncmp(argv[i],"/comman=",8)==0 ||
         strncmp(argv[i],"/command=",9)==0 )
        { filename = strpbrk( argv[i] , "=" );

if (filename++ == NULL)  /*  /command w/o file is illegal  */
            {
            printf("Unrecognized qualifier: '%s'%c\n",argv[i],BELL);
            EXIT ;
            } if (anotherparam != NULL)  /* set an EOS at end of 1st param */
            {
            argv[i] = anotherparam;
            tempchar = *argv[i];
            *argv[i] = EOS;
            } if ( (TempFilePtr = fopen (filename, "r")) == NULL )
            {
```

```
          printf("Error opening command file,
%s%c\n",filename,BELL);
          EXIT ;
          } if ( strcmp( fgetname(TempFilePtr,CharBuff,1) ,
             SYS$INPUT_FILESPEC ) == 0 )
       {
     _CommandFileMode = TRUE;
     _SYS$COMMAND = stdin;
     _CommandFilePtr = stdin;
     }
     else if ( strcmp( fgetname(TempFilePtr,CharBuff,1) ,
              SYS$COMMAND_FILESPEC ) == 0 )
       {
     _CommandFileMode = TRUE;
     _SYS$COMMAND = stdcom;
     _CommandFilePtr = stdcom;
     }
     else
       {
     _CommandFilePtr = TempFilePtr;
     _SYS$COMMAND = _CommandFilePtr;
     _CommandFileMode = TRUE;
     } if (anotherparam != NULL)
       {
     *argv[i] = tempchar;
     goto top;
     } continue;

} /* end of if:  /command=<filename> */ if ( strncmp(argv[i],"/o=",3)==0 ||
        strncmp(argv[i],"/ou=",4)==0 ||
```

```c
          strncmp(argv[i],"/out=",5)==0 ||
          strncmp(argv[i],"/outp=",6)==0 ||
          strncmp(argv[i],"/outpu=",7)==0 ||
          strncmp(argv[i],"/output=",8)==0 )
        {
        filename = strpbrk( argv[i] , "=" );

if (filename++ == NULL)
           {
           printf("Unrecognized qualifier:
'%s%c'\n",argv[i],BELL);
           EXIT ;
           } if (anotherparam != NULL)
           {
           argv[i] = anotherparam;
           tempchar = *argv[i];
           *argv[i] = EOS;
           }

TempFilePtr = fopen (filename, "w");

if ( TempFilePtr == NULL )
           {
           printf("Error opening output file,
%s%c\n",filename,BELL);
           EXIT ;
           }

_SYS$OUTPUT = TempFilePtr;

if (anotherparam != NULL)
           {
           *argv[i] = tempchar;
           goto top;
           }
        continue;
```

```c
            } /* end of if: /output=<filename> */ if ( strncmp(argv[i],"/e=",3)==0 ||
         strncmp(argv[i],"/er=",4)==0 ||
         strncmp(argv[i],"/err=",5)==0 ||
         strncmp(argv[i],"/erro=",6)==0 ||
         strncmp(argv[i],"/error=",7)==0  )
      { filename = strpbrk( argv[i] , "=" );

if (filename++ == NULL)
          {
          printf("Unrecognized qualifier: '%s%c'\n",argv[i],BELL);
          EXIT ;
          } if (anotherparam != NULL)
          {
          argv[i] = anotherparam;
          tempchar = *argv[i];
          *argv[i] = EOS;
          }

TempFilePtr = fopen (filename, "w");

if ( TempFilePtr == NULL )
          {
          printf("Error opening error file, %s%c\n",filename,BELL);
          EXIT ;
          } stderr = freopen(filename, "w", TempFilePtr);

if (anotherparam != NULL)
          {
          *argv[i] = tempchar;
```

```
            goto top;
        } continue;

} /* end of if:  /error=<filename> */ if ( strncmp(argv[i],"/v",2)==0 ||
     strncmp(argv[i],"/ve",3)==0 ||
     strncmp(argv[i],"/ver",4)==0 ||
     strncmp(argv[i],"/verb",5)==0 ||
     strncmp(argv[i],"/verbo",6)==0 ||
     strncmp(argv[i],"/verbos",7)==0 ||
     strncmp(argv[i],"/verbose",8)==0 )
    {

_VerbMode = TRUE;

if (anotherparam != NULL)
        {
         argv[i] = anotherparam;
         goto top;
        } continue;

} /* end of if:  /verb  */ if ( strncmp(argv[i],"/nov",4)==0 ||
     strncmp(argv[i],"/nove",5)==0 ||
     strncmp(argv[i],"/nover",6)==0 ||
     strncmp(argv[i],"/noverb",7)==0 ||
     strncmp(argv[i],"/noverbo",8)==0 ||
     strncmp(argv[i],"/noverbos",9)==0 ||
     strncmp(argv[i],"/noverbose",10)==0 )
    {

_VerbMode = FALSE;
```

```
      if (anotherparam != NULL)
        {
        argv[i] = anotherparam;
        goto top;
        } continue;

}   /* end of if:   /noverb   */ if ( strncmp(argv[i],"/p",2)==0 ||
     strncmp(argv[i],"/pr",3)==0 ||
     strncmp(argv[i],"/pro",4)==0 ||
     strncmp(argv[i],"/prom",5)==0 ||
     strncmp(argv[i],"/promp",6)==0 ||
     strncmp(argv[i],"/prompt",7)==0 )
    {

_PromptMode = TRUE;

if (anotherparam != NULL)
        {
        argv[i] = anotherparam;
        goto top;
        }
    continue;

}   /* end of if:   /prompt   */ if ( strncmp(argv[i],"/nop",4)==0 ||
     strncmp(argv[i],"/nopr",5)==0 ||
     strncmp(argv[i],"/nopro",6)==0 ||
     strncmp(argv[i],"/noprom",7)==0 ||
     strncmp(argv[i],"/nopromp",8)==0 ||
     strncmp(argv[i],"/noprompt",9)==0 )
    {

_PromptMode = FALSE;
```

```c
        if (anotherparam != NULL)
          {
          argv[i] = anotherparam;
          goto top;
          } continue;

}  /* end of if:  /noprompt  */ printf("Unrecognized qualifier:  '%s'%c\n",argv[i],BELL);
      EXIT ;

} /*  end of for each arg  */ else  /*  NOT VMS . . . */

_UnknownSwitches = 0;

for ( i=1; i<argc; i++ )
      {
        if ( strcmp(argv[i],"-c") == 0 )
        {
          TempFilePtr = fopen(argv[i+1], "r");
          if ( TempFilePtr == NULL )
            {
            printf("Error opening command file, %s%c\n",argv[i+1],BELL);
            EXIT ;
            }
          else
            {
            i++;
            _CommandFilePtr = TempFilePtr;
            _SYS$COMMAND = _CommandFilePtr;
            _CommandFileMode = TRUE;
            }
        }
```

```
        else if ( strcmp(argv[i],"-v") == 0 )
        {
           _VerbMode = TRUE;
        } else if ( strcmp(argv[i],"-nv") == 0 )
        {
           _VerbMode = FALSE;
        } else if ( strcmp(argv[i],"-p") == 0 )
        {
           _PromptMode = TRUE;
        } else if ( strcmp(argv[i],"-np") == 0 )
        {
           _PromptMode = FALSE;
        } else
        {
           _UnknownSwitches++;
           argv[_UnknownSwitches-1] = argv[i];
/*
 *         printf("Usage:   -c <filename>   (take commands from <filename>) \n");
 *         printf("         -v              (verbose)\n");
 *         printf("         -nv             (non-verbose)\n");
 *         printf("         -p              (prompt)\n");
 *         printf("         -np             (non-prompt)\n");
 *         EXIT;
 */
        }

} /* end of for each arg */ endif  /* #ifdef VMS , #else , */ return;

}
```

/***************************************************************
************/
/************************** rPrintUsage
 *************************/
/***************************************************************
************/

```
/*
 * Functional Description:
 *
 *      Prints out the READLIB usage string as well as any
application-specific
 *      string passed in the function call.
 *
 * Formal Parameters:
 *
 *      char *ApplicationSpecific = string containing usage
information for
 *                                  any switches specific to
this application
 *
 * Function Value:
 *
 *      void
 *
 */ void   rPrintUsage( char *ApplicationSpecific )
{
  printf("%s",_usage);
  if ( *ApplicationSpecific != EOS )
    printf("       %s\n", ApplicationSpecific );
  return;
}
```

/***************************************************************
************/
/************************** readb

```
*******************************/
/***************************************************************
************/

/*
**++

**  FUNCTIONAL DESCRIPTION:
**
**      Reads a BYTE (char) into the specified argument
**
**  FORMAL PARAMETERS:
**
**      prompt        = NULL terminated string
**      input         = pointer to a BYTE (char)
**      default_value = default value to be assigned to input if no value
**                      is entered.
**
**  FUNCTION VALUE:
**
**      void
**
**--
**/ void  readb( char *prompt, char *input, char default_value )

{
    if ( NOT _Initialized )
    {
        printf( "READLIB initialization not performed.%c\n",BELL);
        printf( "Add:  SETUP(\"prog_name\") to beginning of main program.\n");
        EXIT;
    } sprintf (_DefaultPrompt, "%c\0", default_value);
```

```
FOREVER
   {
   if ( readx( prompt, "B" ) == FALSE )     /*  re-enter  */
       continue;
   else
       {
       if ( END )
          *input = default_value;
       else if ( _line[_index] == '^' )
          {
          _index++;
          *input = default_value;
          if ( _line[_index] == '^' )
              {
              _index++;
              *input = '^';
              }
          while(WHITESPACE) _index++;
          if ( NOTEND )
              {
              WARN("More than one character input.");
              continue;
              }
          }
       else
          {
          *input = _line[_index++];
          while(WHITESPACE) _index++;
          if ( NOTEND )
              {
              WARN("More than one character input.");
              continue;
              }
          }
       } sprintf (_ValidValue, "%c\n", *input);
```

```
        if ( _VerbMode ) fprintf( _SYS$OUTPUT, "%c\n", *input);
        return;

}   /* end of FOREVER */

}
/*************************************************************
************/
/******************************* readc
******************************/
/*************************************************************************
************/

/*
**++
**  FUNCTIONAL DESCRIPTION:
**
**      Reads a COMPLEX number into the specified argument
**
**  FORMAL PARAMETERS:
**
**      prompt        = NULL terminated string
**      input         = pointer to a double float
**      default_value = default value to be assigned to input if no value
**                      is entered.
**
**  FUNCTION VALUE:
**
**      void
**
**--
**/ void  readc( char *prompt, COMPLEX *input, COMPLEX default_value )
{
    char *parse;
    char *end;
```

```
    if ( NOT _Initialized )
      {
      printf( "READLIB initialization not performed.%c\n",BELL);
      printf( "Add:   SETUP(\"prog_name\") to beginning of main
program.\n");
      EXIT;
      } sprintf (_DefaultPrompt, "%.14g, %.14g\0", default_value);

FOREVER
      {
      if ( readx( prompt, "C" ) == FALSE )    /*  re-enter */
         continue;
      else
         {
         if ( END )
            *input = default_value;
         else if ( _line[_index] == '^' )
            {
            _index++;
            *input = default_value;
            while (WHITESPACE) _index++;
            if ( NOTEND )
               {
               WARN("COMPLEX Decode Error.");
               continue;
               }
            }
         else
            {
            parse = &_line[_index];
            if ( *parse == ',' )
               {
               input->real = 0.0;
            parse++;
               }
         else
```

```
            {
            input->real = strtod(parse, &end);
            if ( end == parse && input->real == 0.0 )
               {
               WARN("COMPLEX decode error.");
               continue;
               }
            else  parse = end;
            while ( *parse == TAB || *parse == ' ' ) parse++;
            if ( *parse == ',' ) parse++;
            }
         while ( *parse == TAB || *parse == ' ' ) parse++;
         if ( *parse == EOS )
            {
            input->imag = 0.0;
            }
         else
            {
            input->imag = strtod(parse, &end);
            if ( end == parse && input->imag == 0.0 )
               {
               WARN("COMPLEX decode error.");
               continue;
               }
            else  parse = end;
            while (*parse==TAB||*parse==' ') parse++;
            if ( *parse != EOS )
               {
               WARN("COMPLEX decode error.");
               continue;
               }
            }
         }
      } sprintf (_ValidValue, FMTOSSC, *input);
   if ( _VerbMode ) fprintf( _SYS$OUTPUT, FMTOSSC, *input);
   return;
```

}  /* end of FOREVER */

}

/*******************************************************************
*************/
/******************************* readd
*******************************/
/*******************************************************************
*************/

/*
**++
**  FUNCTIONAL DESCRIPTION:
**
**      Reads a double precision float into the specified argument
**
**  FORMAL PARAMETERS:
**
**      prompt        = NULL terminated string
**      input         = pointer to a double float
**      default_value = default value to be assigned to input if no value
**                      is entered.
**
**
**  FUNCTION VALUE:
**
**      void
**
**--
**/ void  readd( char *prompt, double *input, double default_value )

{
    if ( NOT _Initialized )
    {
        printf( "READLIB initialization not performed.%c\n",BELL);

```
    printf( "Add:   SETUP(\"prog_name\") to beginning of main
program.\n");
    EXIT;
    } sprintf (_DefaultPrompt, "%.14g\0", default_value);

FOREVER
    {
    if ( readx( prompt, "D" ) == FALSE )    /* re-enter  */
        continue;
    else
        {
        if ( END )
            *input = default_value;
        else if ( _line[_index] == '^' )
            {
            _index++;
            *input = default_value;
            while (WHITESPACE) _index++;
            if ( NOTEND )
                {
                WARN("Double Decode Error.");
                continue;
                }
            }
        else if (sscanf(&_line[_index], "%lf", input) != 1)
            {
            WARN("Double decode error.");
            continue;
            }
        } sprintf (_ValidValue, FMTOSST, *input);
    if ( _VerbMode ) fprintf( _SYS$OUTPUT, FMTOSST, *input);
    return;

}   /* end of FOREVER */
```

```
/*******************************************************************
************/
/******************************  readi
******************************/
/*******************************************************************
************/

/*
**++
**  FUNCTIONAL DESCRIPTION:
**
**      Reads a long interger into the specified argument
**
**  FORMAL PARAMETERS:
**
**      prompt        = NULL terminated string
**      input         = pointer to a long integer
**      default_value = default value to be assigned to input if no value
**                      is entered.
**
**  FUNCTION VALUE:
**
**      void
**
**--
**/ void  readi( char *prompt, long int *input, long int default_value )

{ if ( NOT _Initialized )
     {
      printf( "READLIB initialization not performed.%c\n",BELL);
```

```
    printf( "Add:    SETUP(\"prog_name\") to beginning of main
program.\n");
    EXIT;
    } sprintf (_DefaultPrompt, "%d\0", default_value);

FOREVER
  {
  if ( readx( prompt, "I" ) == FALSE )    /*   re-enter   */
      continue;
  else
      {
      if ( END )
        *input = default_value;
      else if ( _line[_index] == '^' )
        {
        _index++;
        *input = default_value;
        while (WHITESPACE) _index++;
        if ( NOTEND )
            {
            WARN("Integer Decode Error.");
            continue;
            }
        }
      else if (sscanf(&_line[_index], "%d", input) != 1)
        {
        WARN("Integer decode error.");
        continue;
        }
      } sprintf (_ValidValue, "%d\n", *input);
  if ( _VerbMode ) fprintf( _SYS$OUTPUT, "%d\n", *input);
  return;

} /* end of FOREVER */
```

}

/*******************************************************************
************/
/******************************** readl
******************************/
/*******************************************************************
************/

/*
**++
**  FUNCTIONAL DESCRIPTION:
**
**      Reads a Logical (BOOL) into the specified argument
**
**  FORMAL PARAMETERS:
**
**      prompt        = NULL terminated string
**      input         = pointer to a BOOL
**      default_value = default value to be assigned to input if no value
**                      is entered.
**
**  FUNCTION VALUE:
**
**      void
**
**--
**/ void readl( char *prompt, BOOL *input, BOOL default_value )

{ if ( NOT _Initialized )
      {
      printf( "READLIB initialization not performed.%c\n",BELL);
      printf( "Add:  SETUP(\"prog_name\") to beginning of main

```
program.\n");
      EXIT;
      } if ( default_value == TRUE )
      sprintf (_DefaultPrompt, "%s\0", "true");
   else
      sprintf (_DefaultPrompt, "%s\0", "false");

FOREVER
     {
     if ( readx( prompt, "Y/N" ) == FALSE )    /* re-enter */
         continue;
     else
         {
         if ( END )
            *input = default_value;
         else if ( _line[_index] == '^' )
            {
            _index++;
            *input = default_value;
            while (WHITESPACE) _index++;
            if ( NOTEND )
                {
                WARN("Logical Decode Error.");
                continue;
                }
            }
         else   /* parse . . . */
            {
            if ( _line[_index] == '.' ) _index++;
            if ( _line[_index] == '1' || _line[_index] == 't' ||
                 _line[_index] == 'T' || _line[_index] == 'y' ||
                 _line[_index] == 'Y' )
               *input = TRUE;
            else if ( _line[_index] == '0' || _line[_index] == 'f'
||
                      _line[_index] == 'F' || _line[_index] == 'n'
```

```
                _line[_index] == 'N' )
            *input = FALSE;
        else
            {
            WARN("Logical Decode Error.");
            continue;
            }
        }
    } if ( *input ) sprintf (_ValidValue, "%s\n", "true");
    else          sprintf (_ValidValue, "%s\n", "false");

if ( _VerbMode )
        {
        if (*input) fprintf( _SYS$OUTPUT, "true\n" );
        else        fprintf( _SYS$OUTPUT, "false\n" );
        } return;

} /* end of FOREVER */

}

/********************************************************************
************/
/******************************* ropen
*********************************/
/********************************************************************
************/

/*
**++
** FUNCTIONAL DESCRIPTION:
**
**      Returns a pointer to the user specified file.
```

```
**
**   FORMAL PARAMETERS:
**
**      prompt        = NULL terminated string
**      default_value = default value to be assigned to input if
no value
**                      is entered.
**      mode          = file access mode ( same as fopen(); )
**
**   FUNCTION VALUE:
**
**      pointer to opened file
**
**--
**/

FILE  *ropen( char *prompt, char *default_value, char *mode )

{

FILE      *temp;
    FILENAME  input,defaultfn,test;

char   *built;
    char   *tilda;
    char   unixfile[512];

if ( NOT _Initialized )
      {
      printf( "READLIB initialization not performed.%c\n",BELL);
      printf( "Add:  SETUP(\"prog_name\") to beginning of main program.\n");
      EXIT;
      } strcpy(_DefaultPrompt, default_value);

ifdef VMS
    INITFILENAME(input)
```

```
    INITFILENAME(test)

INITFILENAME(defaultfn)

if ( file_parse( &defaultfn, _DefaultPrompt ) == FALSE )
       _DefaultPrompt[0] = EOS;
endif FOREVER
      {
      if ( readx( prompt, "FN" ) == FALSE )
         continue;                                    /*  re-enter  */
      else
         {
#ifdef VMS
         if ( _line[_index] == '^' )
           {
           _index++;
           while (WHITESPACE) _index++;
           if (END) _line[0] = EOS;
           }
         if ( file_parse(&test,_line) == FALSE )
           {
           WARN("Invalid file specification.");
           continue;
           }
         else
           input = test;
         built = apply_defaults( &input, &defaultfn );
         temp = fopen( built, mode );
         if ( temp == NULL )    /*  error in filename:  */
           {
           if (mode[0] == 'r')
               WARN("Invalid input file.");
           else
               WARN("Invalid output file.");
           file_parse( &defaultfn, built );
           strcpy(_DefaultPrompt, built);
           continue;
           }
```

```
#else
            if ( _line[_index] == '^' )
              {
              _index++;
              while (WHITESPACE) _index++;
              if ( NOTEND )
                 {
                 WARN("Invalid file specification.");
                 continue;
                 }
              }
            else if ( _line[_index] == '~' )   /* expand home directory */
              {
              _index ++ ;
              strcpy( unixfile, getenv("HOME") );
              strcat( unixfile, &(_line[_index]) );
              built = unixfile;
              goto TryToOpen;
              }
            else if ( strncmp( &(_line[_index]),"$HOME",5 )==0 )
              {
              _index += 5 ;
              strcpy( unixfile, getenv("HOME") );
              strcat( unixfile, &(_line[_index]) );
              built = unixfile;
              goto TryToOpen;
              } if ( END )
            built = default_value;
         else
            built = &(_line[_index]) ;

TryToOpen:
         temp = fopen( built, mode );
         if ( temp == NULL )   /* error in filename: */
            {
```

```
            if (mode[0] == 'r')
                WARN("Invalid input file.");
            else
                WARN("Invalid output file.");
            continue;
            }
#endif
        }

/* If we make it here, the file has been successfully
opened. */ if ( _ToggleInEffect )
        {
        _ToggleInEffect = FALSE;
        if ( _SYS$COMMAND == stdcom ) _SYS$COMMAND =
_CommandFilePtr;
        else                          _SYS$COMMAND = stdcom;
        } if ( _LogMode ) fprintf(_LogFilePtr,"%s\n",built);
    if ( _VerbMode ) fprintf( _SYS$OUTPUT,"%s\n",built);
    return(temp);

} /* end of FOREVER */

}

/*******************************************************************
************/
/******************************* readfn
********************************/
/*******************************************************************
************/

/*
**++
** FUNCTIONAL DESCRIPTION:
**
```

```
**      Reads a file name into the specified string with ROPEN
type
**      defaulting.
**
**   FORMAL PARAMETERS:
**
**      prompt       = NULL terminated prompt string
**      filename     = pointer to string where the file
specification
**                     will be stored
**      numchar      = size of the above character array
**      default_value = default file specification if no value is
entered
**
**   FUNCTION VALUE:
**
**      TRUE if no errors are detected.
**
**--
**/ void  readfn( char *prompt, char filename[], long int numchar,
                                        char *default_value )
{

FILE     *temp;
    FILENAME input,defaultfn,test;

char  *built;

#ifndef VMS
    char  unixfile[512];
endif if ( NOT _Initialized )
      {
      printf( "READLIB initialization not performed.%c\n",BELL);
      printf( "Add:  SETUP(\"prog_name\") to beginning of main
```

```
program.\n");
        EXIT;
        } strcpy(_DefaultPrompt, default_value);

ifdef VMS
    INITFILENAME(input)
    INITFILENAME(test)
    INITFILENAME(defaultfn)
    if ( file_parse( &defaultfn, _DefaultPrompt ) == FALSE )
        _DefaultPrompt[0] = EOS;
endif FOREVER
      {
      if ( readx( prompt, "FN" ) == FALSE )     /*  re-enter  */
          continue;
      else
          {
#ifdef VMS
          if ( _line[_index] == '^' )
            {
            _index++;
            while (WHITESPACE) _index++;
            if (END) _line[0] = EOS;
            } if ( file_parse(&test,_line) == FALSE )
            {
            WARN("Invalid file specification.");
            continue;
            }
          else
              input = test;

built = apply_defaults( &input, &defaultfn );
          if ( strlen(built) >= numchar )
```

```
            {
            WARN("String is not large enough to hold file
specification, readfn().");
            EXIT;
            }
         else
            strcpy (filename, built);

}
else
         if ( _line[_index] == '^' )
            {
            _index++;
            while (WHITESPACE) _index++;
            if ( NOTEND )
               {
               WARN("Invalid file specification.");
               continue;
               }
            }
         else if ( _line[_index] == '~' )    /* expand home
directory */
            {
            _index ++ ;
            strcpy( unixfile, getenv("HOME") );
            strcat( unixfile, &(_line[_index]) );
            built = unixfile;
            }
         else if ( strncmp( &(_line[_index]),"$HOME",5 )==0 )
            {
            _index += 5 ;
            strcpy( unixfile, getenv("HOME") );
            strcat( unixfile, &(_line[_index]) );
            built = unixfile;
            }
         else if ( END )
            built = default_value;
         else
```

```c
            built = &(_line[_index]) ;

if ( strlen(built) >= numchar )
            {
            WARN("String is not large enough to hold file
specification, readfn().");
            continue;
            }
        else
            strcpy (filename, built);

}
#endif
    sprintf( _ValidValue, "%s\n", filename );
    if ( _VerbMode ) fprintf( _SYS$OUTPUT,"%s\n",filename);
    return;

}   /* end of FOREVER */

}

/*******************************************************************
************/
/******************************* reads
********************************/
/*******************************************************************
************/

/*
 *
 * Functional Description:
 *
 *      Reads a string into the specified string buffer.
 *
 * Formal Parameters:
 *
 *      char *prompt - prompt string
```

```
*       char *input   - destination for the string to be rad
*       numchar       - size of the above string including room for
EOS
*       char *default_value - default string if no value is
entered
*
* Function Value:
*
*       void
*
*
*/ void  reads( char *prompt, char input[], long int numchar,
                                 char *default_value )

{ long int length;

if ( NOT _Initialized )
      {
        printf( "READLIB initialization not performed.%c\n",BELL);
        printf( "Add:  SETUP(\"prog_name\") to beginning of main
program.\n");
        EXIT;
      } strcpy(_DefaultPrompt, default_value);

FOREVER
      {
        if ( readx( prompt, "S" ) == FALSE )    /* re-enter */
        continue;
        else
          {
            if ( _line[_index] == '^' )  /* get past "^__" if present
*/
```

```c
            {
                _index++;
                while (WHITESPACE) _index++;
            } if ( END )                          /* user wants default: */
            {
                length = strlen(default_value);
                if ( length >= numchar )
                {
                    WARN("Input too large for string length in reads().");
                    strncpy( input, default_value, numchar-1 );
                    input[numchar-1] = EOS;
                }
                else
                {
                    strcpy( input, default_value );
                    input[length] = EOS;
                } break;
            }

/* User does not want default, use entire _line (not _line[_index]!) */ length = strlen(_line);
        if ( length >= numchar )
            {
                WARN("String length too small, reads().");
                strncpy( input, _line, numchar-1 );
                input[numchar-1] = EOS;
            }
        else
            {
                strcpy( input, _line );
```

```
            input[length] = EOS;
         } break;
      }

}  /* end of FOREVER */ sprintf( _ValidValue, "%s\n", input );
   if ( _VerbMode ) fprintf( _SYS$OUTPUT,"%s\n",input);
   return;

}

/*******************************************************************
************/
/*********************************** file_parse
*******************************/
/*******************************************************************
************/

/*
**++
**  FUNCTIONAL DESCRIPTION:
**
**      Returns a structure containing the VMS file components of an input
**      string.
**
**  FORMAL PARAMETERS:
**
**      name   = pointer to desired FILENAME structure
**      string = string to be parsed
**
**  FUNCTION VALUE:
**
**      TRUE if the string has been successfully parsed
**      FALSE if an error in string
```

```
**
**--
**/

BOOL   file_parse( FILENAME *name , char *string )

{
#ifdef VMS
    static   char   *ValidChar =
       "abcdefghijklmnopqrstuvwxyzABCDEFGHIJKLMNOPQRSTUVWXYZ0123456789-_$" ;

static   char   *SpecialDevice = "tt:tT:Tt:TT:nl:nL:Nl:NL:" ;

char   element[256];
    char   *parse = string;

BOOL   Node = TRUE ;
    BOOL   Device = FALSE ;
    BOOL   Path = FALSE ;
    BOOL   Name = FALSE ;
    BOOL   Type = FALSE ;
    BOOL   Version = FALSE ;

int    index;

/*   skip leading white space   */ while ( *parse == ' ' || *parse == TAB ) parse++;

/*   parse the string   */

FOREVER

{
       /*  make an element : */ index = 0;
```

```
while ( strchr(ValidChar,*parse) != 0 && *parse != EOS)
    element[index++] = *parse++;
element[index] = EOS;

if (Node)
    {
    Node = FALSE;
    Device = TRUE;
    if (parse[0]==':' && parse[1]==':')
       {
       parse+=2;
       if (element[0]==EOS)
           name->node[0] = ERASE;
       else
          {
          strcpy (name->node, element);
          strcat (name->node, "::");
          }
       continue;
       }
    } if (Device)
    {
    Device = FALSE;
    if (parse[0]==':' )
       {
       if (parse[1]=='[')
           Path = TRUE;
       else
           Name = TRUE;
       parse++;
       if (element[0]==EOS)
           name->device[0] = ERASE;
       else
           {
           strcpy (name->device, element);
           strcat (name->device, ":");
```

```c
            if ( strstr(SpecialDevice,name->device) != NULL )
              {
              name->node[0] = ERASE;
              name->path[0] = ERASE;
              name->name[0] = ERASE;
              name->type[0] = ERASE;
              name->version[0] = ERASE;
              return(TRUE);
              }
            }
         continue;
         }
      else
         {
         if (parse[0]=='[')
            Path = TRUE;
         else
            Name = TRUE;
         }
      } if (Path)
   {
   Path = FALSE;
   Name = TRUE;
   if ( parse[1] == ']' )
      {
      name->path[0] = ERASE;
      parse+=2;
      }
   else
      {
      index = 0;
      name->path[index++] = *parse++;
      while ( *parse != ']' )
         {
         if ( *parse == EOS ) return(FALSE);
         if ( (strchr(ValidChar,*parse) != 0) || (*parse ==
```

```
                name->path[index++] = *parse++;
              else
                return(FALSE);
            }
          name->path[index++] = *parse++;
          name->path[index] = EOS;
        }
      continue;
    } if (Name)
    {
    Name = FALSE;
    Type = TRUE;
    if ( *parse=='.' || *parse==';' || *parse==EOS )
      {
      strcpy(name->name,element);
      continue;
      }
    else return(FALSE);
    } if (Type)
    {
    Type = FALSE;
    Version = TRUE;
    if (*parse=='.')
      {
      index = 0;
      element[index++] = *parse++;
      while ( strchr(ValidChar,*parse) != 0 && *parse != EOS)
          element[index++] = *parse++;
      element[index] = EOS;
      if (index==1)
          name->type[0] = ERASE;
      else
```

```c
                    strcpy(name->type,element);
                }
            continue;
            } if (Version)
            {
            if (*parse==';')
                {
                index = 0;
                element[index++] = *parse++;
                if ( *parse == '-' ) element[index++] = *parse++;
                while ( *parse >= '0' && *parse <= '9' )
                    element[index++] = *parse++;
                element[index] = EOS;
                if (index==1)
                    name->version[0] = ERASE;
                else
                    strcpy(name->version,element);
                }
            while ( *parse == ' ' || *parse == TAB ) parse++;
            if ( *parse != EOS ) return(FALSE);
            else   break;

}

} /* end of FOREVER */

/*    printf("string = %s, %d characters\n\n",string,strlen(string));

printf("node = %s\n",name->node);
    printf("device = %s\n",name->device);
    printf("path = %s\n",name->path);
    printf("name = %s\n",name->name);
    printf("type = %s\n",name->type);
    printf("version = %s\n\n",name->version);    */
```

```
        return(TRUE);
#else
    printf("file_parse() only implemented in VMS!%c\n",BELL);
    EXIT;
#endif

}

/******************************************************************
************/
/****************************** apply_defaults
******************************/
/******************************************************************
************/

/*
**++
** FUNCTIONAL DESCRIPTION:
**
**      Builds a filename string to be passed to fopen by applying defaults
**      to any missing values in user input string.
**
** FORMAL PARAMETERS:
**
**      input = pointer to user input FILENAME structure
**      defaultfn = pointer to default FILNAME structure
**
** FUNCTION VALUE:
**
**      built string
**
**--
**/ char  *apply_defaults( FILENAME *input, FILENAME *defaultfn )

{
```

```c
    static char temp[255];

temp[0] = EOS;

if ( input->node[0] != ERASE )
    {
      if ( input->node[0] != EOS )
          strcat( temp , input->node );
      else if ( defaultfn->node[0] != EOS && defaultfn->node[0] != ERASE )
          strcat( temp , defaultfn->node );
    } if ( input->device[0] != ERASE )
    {
      if ( input->device[0] != EOS )
          strcat( temp , input->device );
      else if ( defaultfn->device[0] != EOS && defaultfn->device[0] != ERASE )
          strcat( temp , defaultfn->device );
    } if ( input->path[0] != ERASE )
    {
      if ( input->path[0] != EOS )
          strcat( temp , input->path );
      else if ( defaultfn->path[0] != EOS && defaultfn->path[0] != ERASE )
          strcat( temp , defaultfn->path );
    } if ( input->name[0] != ERASE )
    {
      if ( input->name[0] != EOS )
          strcat( temp , input->name );
      else if ( defaultfn->name[0] != EOS && defaultfn->name[0] != ERASE )
          strcat( temp , defaultfn->name );
    }
```

```
        if ( input->type[0] != ERASE )
           {
           if ( input->type[0] != EOS )
              strcat( temp , input->type );
           else if ( defaultfn->type[0] != EOS && defaultfn->type[0] !=
ERASE )
              strcat( temp , defaultfn->type );
           }
        if ( input->version[0] != ERASE )
           {
           if ( input->version[0] != EOS )
              strcat( temp , input->version );
           else if (defaultfn->version[0] != EOS && defaultfn-
>version[0] != ERASE)
              strcat( temp , defaultfn->version );
           } return(temp);

}

/*****************************************************************
************/
/****************************** freadnd
************************************/
/*****************************************************************
************/

/*
**++
**  FUNCTIONAL DESCRIPTION:
**
**      Reads num double precision reals from a file by reading in an entire
**      record (string) and parsing to figure out what values were entered.
**      If any numbers are missing, they are set to zero.  The
```

```
   parameter list
**       consists of a list of double pointers, one for each input.
**
**  FORMAL PARAMETERS:
**
**       InputPtr = pointer to input FILE
**    num       = number of doubles to read
**
**  FUNCTION VALUE:
**
**       EOF   if end of file detected
**       TRUE  if successfull
**
**  NOTE:  the function exits upon an input conversion error.
**
**--
**/ int  freadnd( FILE *InputPtr, int num, ... )

{ char  *parse;
   char  *end;
   va_list  VarArgPtr;
   double *CurDoublePtr;

if ( fgets(_line,MAXRECORD,InputPtr) == NULL ) return(EOF);
   CRLF_TO_EOS;
   parse = _line;

va_start(VarArgPtr,num);   /* Initialize VarArgPtr to beginning
of list */ for ( ; num > 0 ; num -- )

{
```

```
CurDoublePtr = va_arg(VarArgPtr,double*);
*CurDoublePtr = 0.0;

if ( *parse == EOS ) continue;

while ( *parse==' ' || *parse==TAB ) parse++;   /* skip
leading white */ if ( *parse == ',' )
    {
    parse++;
    continue;
    }

*CurDoublePtr = strtod (parse, &end);

if ( end == parse && *CurDoublePtr==0.0 )
    {
    printf("%%READND-F-INPCONERR,  input conversion
error.%c\n",BELL);
    printf("Offending character is '%c' .\n",*parse);
    EXIT;
    }
else
    parse = end;

while ( *parse==' ' || *parse==TAB ) parse++;   /* skip
trailing white */ if (*parse==',') parse++;                       /* ignore one
comma */ if (parse==end && *parse != EOS)      /* no space,no comma, &
NOT EOS */
    {
    printf("%%READND-F-INPCONERR,  input conversion
error.%c\n",BELL);
```

```
            printf("Offending character is '%c' .\n",*parse);
            EXIT;
            }

} return(TRUE);

}

/******************************************************************
************/
/******************************* IsTerminal
******************************/
/******************************************************************
************/

/*
**++
**   FUNCTIONAL DESCRIPTION:
**
**      Determines if a logical name points to a physcial
terminal.
**
**   FORMAL PARAMETERS:
**
**      LogicalName = char string to be tested
**
**   FUNCTION VALUE:
**
**      TRUE  if LogicalName points to a physical terminal.
**      FALSE  if not.
**
**--
**/
BOOL  IsTerminal( char *LogicalName )

{
```

```c
#ifdef VMS
    static  char    *TableName = "LNM$PROCESS_TABLE" ;
    static  char    TranslatedName[LNM$C_NAMLENGTH+1];
    long int        status;
    long int        index;
    short int       rtnlen;

struct lnmdef   attr = { 0,0,0,0,0,  0,0,0,0,  0,0,0,  0,0,0 };

struct dsc$descriptor_s tabnam = { strlen(TableName),
DSC$K_DTYPE_T,
                                       DSC$K_CLASS_S, TableName } ;
    struct dsc$descriptor_s lognam = { strlen(LogicalName),
DSC$K_DTYPE_T,
                                       DSC$K_CLASS_S, LogicalName } ;

ITMLST  item[4] = {
        { 4,                LNM$_MAX_INDEX,  &index,          0 },
        { 4,                LNM$_INDEX,      &index,          0 },
        { LNM$C_NAMLENGTH,  LNM$_STRING,     TranslatedName,  &rtnlen
},
        { 0,                0,               0,               0 }
            };

attr.lnm$v_case_blind = 1;

status = sys$trnlnm ( &attr, &tabnam, &lognam, 0, item);

if ( status != SS$_NORMAL ) lib$signal( status );
    if ( (TranslatedName[0] == 0x1B) && (TranslatedName[1] == 0x00) )
      {
        if ( strncmp(&TranslatedName[4],"_HARDY$",6) == 0 ||
             strncmp(&TranslatedName[4],"_LAUREL$",7) == 0 ||
             strncmp(&TranslatedName[4],"_RUNNER$",7) == 0 ||
             strncmp(&TranslatedName[4],"_HOCKEY$",7) == 0 ||
             strncmp(&TranslatedName[4],"_REAPER$",7) == 0 )
          {
```

```
/*         printf("%s = %s\n",LogicalName,&(TranslatedName[4]));
*/
           return(TRUE);
           }
       else
           {
/*         printf("%s = %s\n",LogicalName,&(TranslatedName[4]));
*/
           return(FALSE);
           }
       }
   else
       {
/*     printf("%s = %s\n",LogicalName,&(TranslatedName[0])); */
       return(FALSE);
       }
else
    return(TRUE);
#endif
}

/*****************************************************************
************/
/******************************* freadcofhdr
******************************/
/*****************************************************************
************/

/*
**++
**  FUNCTIONAL DESCRIPTION:
**
**      Reads and interprets a header to a .COF file
**
**  FORMAL PARAMETERS:
**
```

```
**        FilePtr = Open file from which a header will be read
**        NumCof  = int pointer where number of coefficients will be stored
**        Type    = char pointer where section type will be stored
**
**  FUNCTION VALUE:
**
**        EOF    if end of file is detected
**        TRUE   otherwise.  However, if an input conversion error occurs
**                           (i.e. the line does not represent a valid
**                           .COF header), Type is set to EOS.
**
**--
**/

BOOL freadcofhdr( FILE *FilePtr, int *NumCof, char *Type )

{
    char   _line[128];
    char   *temp;
    int    _index;
    int    value;
/*  #ifdef  VMS   */

_index = 0;

if ( fgets(_line,127,FilePtr) == NULL ) return(EOF);

CRLF_TO_EOS;

*NumCof = strtol (_line, &temp, 10);

if (temp == NULL)    /*  no type is present! */
    {
      *Type = EOS;
      return(TRUE);
```

```c
        } while ( *temp == ' ' || *temp == TAB || *temp == ',' ) temp++
;

if      ( *temp == 'n' || *temp == 'N' ) *Type = 'N';
    else if ( *temp == 'd' || *temp == 'D' ) *Type = 'D';
    else                                     *Type = EOS;

/* else
    value = fscanf(FilePtr, FMTICOF, NumCof, Type);
    if ( value == EOF ) return (EOF);

if ( value == 2 )
     {
      if      ( *Type == 'n' || *Type == 'N' ) *Type = 'N';
      else if ( *Type == 'd' || *Type == 'D' ) *Type = 'D';
      else                                     *Type = EOS;
     }
    else
      *Type = EOS;
#endif

*/ return(TRUE);

}

/*****************************************************************
*************/
/******************************** readx
*****************************/
/*****************************************************************
```

```
/*
**++
**   FUNCTIONAL DESCRIPTION:
**
**       Displays read% prompt on screen, gets user input, and determines
**       if a readlib code has been entered.  If so, it takes the appropriate
**       action and returns FALSE.  If not, it returns TRUE (implying further
**       parsing is necessary).
**
**   FORMAL PARAMETERS:
**
**       none
**
**   GLOBAL VARIABLES ACCESSED AND/OR CHANGED :
**
**     _line     = used to store user input
**     _index    = used to step throught input array
**     _SYS$xxx  = defined in rinit
**     _DefaultPrompt = string representing the default input
**
**   FUNCTION VALUE:
**
**       TRUE = more parsing necessary
**       FALSE = re-entry is needed in calling routine
**
**--
**/

BOOL readx( char *prompt, char *type )

{

/* initializations */
```

```c
    _index = 0

/* display prompt */ if ( _PromptMode )
       fprintf( _SYS$OUTPUT, "%s? [%s] {%s}: ", prompt, type,
_DefaultPrompt);

/* get user input */ if ( fgets( _line, 512, _SYS$COMMAND ) == NULL )
      EXIT ;                               /* exit on ctrl:z */
    /* if not verb and input is not from terminal, print */
    /*          un-interpreted input                     */ if ( _PromptMode && NOT _VerbMode && NOT (
        ( _SYS$COMMAND == stdcom && IsTerminal("SYS$COMMAND") ) ||
        ( _SYS$COMMAND == stdin  && IsTerminal("SYS$INPUT") ) )
)
       fprintf( _SYS$OUTPUT, "%s", _line );

while (WHITESPACE) _index++;    /* ignore whitespace */

CRLF_TO_EOS;                /* change line feed to EOS */ if ( ENTERLOGMODE )              /* ?log */
      {
       if ( _LogMode )
          {
          if (_VerbMode) fprintf( _SYS$OUTPUT,
             "** Already in Log Mode **%c\n",BELL );
          return(FALSE);
          }
       _LogMode = TRUE;
       if ( (_LogFilePtr = fopen(_logfile, "w")) == NULL )
          {
          fprintf(_SYS$OUTPUT, "Error opening log file %s
.%c\n",_logfile,BELL);
```

```c
        EXIT ;
        }
    if (_VerbMode) fprintf( _SYS$OUTPUT,
           "** Entering Log Mode **%c\n",BELL );
    return(FALSE);
    } if ( SWITCHENTRYMODE )        /*  ?switch */
    {
    if ( _CommandFileMode )
        {
        fprintf(_SYS$OUTPUT,
            "** Switching Command Input Mode **%c\n",BELL);
        if ( _SYS$COMMAND == stdcom )
          {
          _SYS$COMMAND = _CommandFilePtr;
          return(FALSE);
          }
        else
          {
          _SYS$COMMAND = stdcom;
          return(FALSE);
          }
        }
    else
        {
        fprintf( _SYS$OUTPUT,
#ifdef VMS
          "/command=<filename> must be in effect to use
?switch.%c\n",
#else
          "-c <filename> must be in effect to use ?switch.%c\n",
#endif
           BELL);
        return(FALSE);
        }
    }
```

```c
    if ( TOGGLEENTRYMODE )          /*  ?toggle */
    {
       if ( _CommandFileMode )
          {
          fprintf(_SYS$OUTPUT,
             "** Switching Command Input Mode For Next Entry **%c\n",BELL);

_ToggleInEffect = TRUE;

if ( _SYS$COMMAND == stdcom )
            {
            _SYS$COMMAND = _CommandFilePtr;
            return(FALSE);
            }
          else
            {
            _SYS$COMMAND = stdcom;
            return(FALSE);
            }
          }
       else
           {
           fprintf( _SYS$OUTPUT,
#ifdef VMS
           "/command=<filename> must be in effect to use ?toggle.%c\n",
#else
           "-c <filename> must be in effect to use ?toggle.%c\n",
#endif
              BELL);
           return(FALSE);
           }
    } return(TRUE);   /* if input needs to be further parsed, return TRUE */
```

}

---

```c
#ifndef __DEFRLIB
#define __DEFRLIB

/*  #define __VMS  */ include <standards.h>
include <defcmath.h>
include <stdio.h> ifndef EXTERN          /* if programmer did not specify this is
main module: */
#define EXTERN extern
endif /* READLIB global variables  */

EXTERN  int    _UnknownSwitches;  /* lets programmers know how many command- */
                                  /* line switches were not readlib switches */

EXTERN  char   _usage[128];       /* usage string */

EXTERN  BOOL   _VerbMode;
EXTERN  BOOL   _PromptMode;
EXTERN  BOOL   _LogMode;
EXTERN  BOOL   _CommandFileMode;
EXTERN  BOOL   _Initialized;
EXTERN  BOOL   _ToggleInEffect;

EXTERN  int    _process_mode;
EXTERN  char   _ValidValue[256];
EXTERN  char   _logfile[65];
```

```
EXTERN   FILE *stdcom;
EXTERN   FILE *_CommandFilePtr;
EXTERN   FILE *_LogFilePtr;
EXTERN   FILE *_SYS$INPUT;     /* 'data'    source      */
EXTERN   FILE *_SYS$COMMAND;   /* 'command' source      */
EXTERN       FILE *_SYS$OUTPUT;   /* 'output' destination */
EXTERN       FILE *_SYS$ERROR; /* 'error' destination    */

/* Control MACRO's */ define  SETUP(PROG)                                              \
strcpy(_logfile, PROG) ;                                          \
strcat(_logfile, ".tlg") ;                                        \
sprintf(_usage,                                                   \
"Usage: %s [-c command_file] [-[n]v ([non-]verbose)] [-[n]p ([non-]prompt)]\n",\
       PROG);                                                     \
rinit( argc , argv );

#define  DO                                                       \
for(;;)                                                           \
    {   /* loop closed by UNTIL */ define  UNTIL(VALID,MESSAGE)                                     \
    if (VALID)                                                    \
        {                                                         \
        if ( _LogMode ) fprintf(_LogFilePtr,"%s",_ValidValue);    \
        if ( _ToggleInEffect )                                    \
            {                                                     \
            _ToggleInEffect = FALSE;                              \
            if ( _SYS$COMMAND == stdcom ) _SYS$COMMAND = _CommandFilePtr;\
```

```
            else                              _SYS$COMMAND = stdcom;\
        }                                                        \
      break;                                                     \
    }                                                            \
  else                                                           \
    printf("%s%c\n\n",MESSAGE,BELL);                             \
}
```

```c
/*  function prototypes  */ extern void   readb( char *prompt, char *input, char default_value
);
extern void   readc( char *prompt, COMPLEX *input, COMPLEX
default_value );
extern void   readd( char *prompt, double *input, double
default_value );
extern void   readi( char *prompt, long int *input, long int
default_value );
extern void   readl( char *prompt, BOOL *input, BOOL default_value
);
extern FILE  *ropen( char *prompt, char *default_value, char *mode
);
extern void   readfn( char *prompt, char filename[], long int
numchar,
                                   char *default_value );
extern void   reads( char *prompt, char input[], long int numchar,
                                   char *default_value );

extern void   rinit( int argc, char *argv[] );
extern void   rPrintUsage( char *ApplicationSpecific );

/*  miscellaneous functions  */ extern int    freadnd( FILE *InputPtr, int num, ... );

/* File READ N Double precision floats from the current line.
            */
/* InputPtr is a pointer to an open FILE, num is the number of
```

```
double          */

/* precistion floats to read from the current line, and the ...
arguments   */

/* are pointers to each double to be read (there should be num
such`       */

/* pointers).    Returns EOF if end of file is detected, it
EXIT's upon an  */

/* input conversion error.
*/

/* Two successive commas results in the corresponding double being
set      */

/* to 0.  Any numbers remaining to be assigned after end of string
(EOS)    */

/* is detected are also set to 0.
*/ define FREADCMPLX(FilePtr,ComplexData) \
freadnd( FilePtr, 2, &(ComplexData.real), &(ComplexData.imag) )

/* reads a COMPLEX data point from the file pointed to by FilePtr
*/
extern BOOL  freadcofhdr( FILE *FilePtr, int *NumCof, char *Type
);

/* File READ .COF HeaDerR.  Assigns the number of coefficients to
NumCof */
/* and the section type ('N' or 'D') to Type.  It returns EOF if
*/
/* end of file is detected, otherwise it returns TRUE.  If an
input       */
/* conversion error occurs, Type is set to EOS.
*/ endif
```

```
#ifndef __STANDARDS
#define __STANDARDS

/*   MACRO's   */ define FMTOSST "%.14g\n"           /* output format -- .SST file */
define FMTOSSC "%.14g, %.14g\n"    /* output format -- .SSC file */
#define FMTOCOF "%d,%c\n"           /* output format -- .COF section
header */ define FMTICOF "%d, %c"            /* input format -- .COF section
header */
#define FMTISSC "%lf, %lf"          /* input format -- .SSC file */
define FMTISST "%lf"               /* input format -- .SST file */ ifndef EOS
define EOS   0x00
endif define BELL 0x07
define CALLOC(a,b)   (b *)calloc(a,sizeof(b))
#define MALLOC(a,b)   (b *)malloc(a*sizeof(b))
#define INVSQRT2   0.7071067811865475244400844362105
#define PI         3.1415926535897932384626433383280
#define PI2        6.2831853071795864769252867665590

/*   typedef's   */
typedef long int BOOL;

#ifndef TRUE
#define TRUE 1
endif ifndef FALSE
define FALSE 0
endif endif
```

What is claimed is:

1. In an quadrature amplitude modulation (QAM) communication system comprised of a composite signal, having a peak power level and an average power level, for transmission on a communication channel, which composite signal is comprised of a plurality of QAM subchannel signals combined together, at least one; of which QAM subchannel signals includes: a) a plurality of complex-valued QAM information symbols, each of which information symbols are located substantially on one of n where n is an integer constellation points of a complex plane, each constellation point being defined by a discrete magnitude and discrete phase angle from a predetermined reference point in the complex plane; and b) a plurality of predetermined complex-valued pilot symbols, each having a magnitude and phase, each of said plurality of QAM subchannel signals having an average power level and having a peak power level over a finite length of time, a method of reducing the ratio of the peak power level to average power level in said composite signal comprised of:

combining at least one of said complex-valued QAM information symbols, with at least one, complex-valued, non-constellation-based pilot symbol, to form at least a first QAM subchannel signal;
   combining said QAM subchannel signal with at least one other QAM subchannel signal to form a composite signal; and
   transmitting, said composite signal on said communication channel.

2. The method of claim 1 including the step of pulse shape filtering said QAM subchannel signal prior to transmission on said communication channel to form filtered QAM subchannel signals.

3. The method of claim 2 including the step of modulating each filtered QAM subchannel signal to a predetermined subchannel center frequency.

4. The method of claim 3 including the step of combining each of the modulated filtered QAM subchannel signal to produce said composite signal.

5. In an quadrature amplitude modulation (QAM) communication system comprised of a composite signal having an average power level and a peak power level, for transmission on a communication channel, which composite signal is comprised of a plurality of QAM subchannel signals combined together, each of said QAM subchannel signals being comprised of: a) a plurality of complex-valued QAM information symbols, each of which information symbols are located substantially on one of n where n is an integer constellation points of a complex plane, each point being defined by a discrete magnitude and phase angle from a predetermined reference; and b) complex-valued pilot symbols combined with said QAM information symbols at predetermined pilot symbol times over a predetermined time period, each pilot symbol having a magnitude and phase; a method of reducing the ratio of the peak power level to average power level in said composite signal comprised of:

during a finite time period during which a plurality of QAM subchannels has at least one, pilot symbol:
   at least one of said QAM subchannel signals, has a first-valued pilot (fixed pilot QAM subchannel signals);
   in at least one other QAM subchannel signal, combining with said QAM information symbols, a second-valued pilot symbol to form a second QAM subchannel signal;
   combining said fixed pilot QAM subchannel signals with said second QAM subchannel signal to form a composite signal; and
   transmitting said composite signal on said communication channel.

6. In an n-level quadrature amplitude modulation (QAM) communication system comprised of a composite signal having an average power level and a peak power level, for transmission on a communication channel, which composite signal is comprised of a plurality of QAM subchannel signals combined together, each of said QAM subchannel signals being comprised of: a) a plurality of complex-valued QAM information symbols, each of which information symbols are, located substantially on one of n where n is an integer constellation points of a complex plane; and b) complex-valued pilot symbols combined with said QAM information symbols at predetermined pilot symbol times, each pilot symbol having a magnitude and phase; a method of reducing the ratio of the peak power level to average power level in said composite signal comprised of:

in a first QAM subchannel signal, combining with QAM information symbols thereon, at said pilot symbol times, at least one pilot symbol selected from a first set of complex, non-fixed-values, to form said first QAM subchannel signal;
   in a second QAM subchannel signal, combining with QAM information symbols thereon, at said pilot symbol times, at least one pilot symbol selected from a second set of complex, non-fixed-values, to form said second QAM subchannel signal;
   combining said first and second QAM subchannel signals with at least one other QAM subchannel signal to form a composite signal; and
   transmitting said composite signal on said communication channel.

7. In a quadrature amplitude modulation (QAM) communication system comprised of a composite signal for transmission on a communication channel, which composite signal is comprised of a plurality of QAM subchannel signals combined together, of which each QAM subchannel signal includes: a) QAM information symbols (QAM symbols), said QAM symbols having an average power level and having a peak power level over a finite length of time; and b) a plurality of predetermined complex-valued pilot symbols, each having a magnitude and phase, and that are combined with said QAM symbols, said complex-valued pilot symbols having an average power level and having a peak power level over a finite length of time, a method of reducing the ratio of the peak power level to average power level in said composite signal comprised of:

selecting phase angles for a plurality of fixed-amplitude pilot symbols for a plurality of said subchannels, which pilot symbols can include both constellation based, and non-constellation-based pilot symbols (preselected pilot symbols), to minimize the peak-to-average power ratio of the composite signal over a finite length of time;
   combining said preselected pilot symbols for each subchannel with QAM symbols on said subchannel to form piloted QAM subchannel symbol streams; and
   transmitting combined preselected pilot symbols and QAM symbols on said communication channel.

8. The method of claim 7 including the step of pulse shape filtering said piloted QAM subchannel symbol streams prior to transmission on a communication channel to form filtered QAM symbol streams.

9. The method of claim 8 including the step of modulating each filtered QAM symbol stream to a predetermined subchannel center frequency.

10. The method of claim 9 including the step of combining each of the modulated filtered QAM symbol streams at their respective subchannel center frequencies to produce said composite signal.

11. In a quadrature amplitude modulation (QAM) communication system comprised of a composite signal for transmission on a communication channel, which composite signal is comprised of a plurality of QAM subchannel signals combined together, of which each QAM subchannel signal includes: a) QAM information symbols (QAM symbols), said QAM symbols having an average power level and having a peak power level over a finite length of time; and b) a plurality of complex-valued pilot symbols, each having a magnitude and phase, and that are combined with said QAM symbols, said complex-valued pilot symbols having an average power level and having a peak power level over a finite length of time, a method of reducing the ratio of the peak power level to the average power level in said composite signal comprised of:
- selecting phase angles for a plurality of fixed-amplitude pilot symbols for a plurality of said subchannels, which pilot symbols can include both constellation based, and non-constellation-based pilot symbols (preselected pilot symbols), to minimize the peak-to-average power ratio of the composite signal over a finite length of time;
- combining said preselected pilot symbols for each subchannel with QAM symbols on said subchannel; and
- transmitting the combined preselected pilot symbols and QAM symbols on said communication channel.

12. The method of claim 11 including the step of pulse shape filtering said piloted QAM subchannel symbol streams prior to transmission on a communication channel to form filtered QAM symbol streams.

13. The method of claim 12 including the step of modulating each filtered QAM symbol stream to a predetermined subchannel center frequency.

14. The method of claim 13 including the step of combining each of the modulated filtered QAM symbol streams at their respective subchannel center frequencies to produce said composite signal.

15. In a quadrature amplitude modulation (QAM) communication system comprised of a composite signal for transmission on a communication channel, which composite signal is comprised of a plurality of QAM subchannel signals combined together, of which each QAM subchannel signal includes: a) QAM information symbols (QAM symbols), said QAM symbols having an average power level and having a peak power level over a finite length of time; and b) a plurality of complex-valued pilot symbols, each having a magnitude and phase, and that are combined with said QAM symbols, said complex-valued pilot symbols having an average power level and having a peak power level over a finite length of time, a method of reducing the ratio of the peak power level to the average power level in said composite signal comprised of:
- selecting magnitudes and phase angles for a plurality of pilot symbols for a plurality of said subchannels, which pilot symbols can be both constellation based, and non-constellation based, (preselected pilot symbols) to minimize the peek-to-average power ratio of complex-valued composite signals over a finite length of time;
- combining said preselected pilot symbols for each subchannel with QAM symbols on said subchannel;
- transmitting the combined preselected pilot symbols and QAM symbols on said communication channel.

16. The method of claim 15 including the step of pulse shape filtering said piloted QAM subchannel symbol streams prior to transmission on a communication channel to form filtered QAM symbol streams.

17. The method of claim 16 including the step of modulating each filtered QAM symbol stream to a predetermined subchannel center frequency.

18. The method of claim 17 including the step of combining each of the modulated filtered QAM symbol streams at their respective subchannel center frequencies to produce said composite signal.

19. In an quadrature amplitude modulation (QAM) communication system comprised of a composite signal for transmission on a communication channel, which composite signal is comprised of a plurality of QAM subchannel signals combined together, at least one of which QAM subchannel signal includes: a) a plurality of complex-valued information symbols, each of which information symbols are located substantially on one of n where n is an integer constellation points of a complex plane, each constellation point being defined by a discrete magnitude and discrete phase angle from a predetermined reference point in the complex plane; and b) a plurality of predetermined complex-valued pilot symbols, each having a magnitude and phase, each of said plurality of QAM subchannel signals having an average power level and having a peak power level over a finite length of time, a method of reducing the ratio of the peak power level to average power level in said composite signal comprised of:
- selecting phase angles for a plurality of fixed-amplitude pilot symbols for a plurality of said subchannels (preselected pilot symbols) such that at least one of said complex-valued pilot symbols is a non-constellation-based pilot symbol;
- combining said preselected pilot symbols for each subchannel with QAM symbols on said subchannel to form piloted QAM subchannel symbol streams; and
- transmitting the combined preselected pilot symbols and QAM symbols on said communication channel.

20. In an quadrature amplitude modulation (QAM) communication system comprised of a composite signal, having a peak power level and an average power level, for transmission on a communication channel, which composite signal is comprised of a plurality of QAM subchannel signals combined together, at least one of which QAM subchannel signal includes: a) a plurality of complex-valued QAM information symbols, each of which information symbols are located substantially on one of n where n is an integer constellation points of a complex plane, each constellation point being defined by a discrete magnitude and discrete phase angle from a predetermined reference point in the complex plane; and b) a plurality of predetermined complex-valued pilot symbols, combined with the QAM information symbols over a finite length of time, each having a magnitude and phase, each of said plurality of QAM subchannel signals having an average power level and having a peak power level over a finite length of time, a method of reducing the ratio of the peak power level to average power level in said composite signal comprised of:

combining at least one of said complex-valued QAM information symbols, with a plurality of complex-valued, non-constellation-based pilot symbols, having a plurality of phase angles, to form at least one QAM subchannel signal;

combining said QAM subchannel signal with at least one other QAM subchannel signal to form a composite signal; and transmitting said composite signal on said communication channel.

* * * * *